(12) United States Patent
Choi et al.

(10) Patent No.: US 7,007,917 B2
(45) Date of Patent: Mar. 7, 2006

(54) ELECTROMAGNETIC CONTROL VALVE

(75) Inventors: Jung Hoon Choi, Gyeonggi-do (KR);
Young Joo Yee, Gyeonggi-do (KR);
Seong Hyok Kim, Seoul (KR); In Kyu Kim, Gyeongsangnam-do (KR);
Byeong Hwa Chung, Gyeongsangnam-do (KR)

(73) Assignee: LG Electronics Inc., Seoul (KR)

( * ) Notice: Subject to any disclaimer, the term of this patent is extended or adjusted under 35 U.S.C. 154(b) by 160 days.

(21) Appl. No.: 10/780,837

(22) Filed: Feb. 19, 2004

(65) Prior Publication Data

US 2005/0006611 A1    Jan. 13, 2005

(30) Foreign Application Priority Data

Jul. 7, 2003  (KR) ............... 10-2003-0045729
Jul. 7, 2003  (KR) ............... 10-2003-0045730

(51) Int. Cl.
*F16K 31/08* (2006.01)

(52) U.S. Cl. ............... 251/65; 251/122; 251/129.02; 251/129.21

(58) Field of Classification Search ............... 251/65, 251/122, 129.02, 129.21, 129.15
See application file for complete search history.

(56) References Cited

U.S. PATENT DOCUMENTS

| 3,069,846 A | * | 12/1962 | Buescher | 251/122 |
| 3,090,423 A | * | 5/1963 | Atterbury, Jr. et al. | 251/122 |
| 4,296,912 A | * | 10/1981 | Ruyak | 251/65 |
| 5,232,195 A | * | 8/1993 | Torrielli | 251/122 |
| 5,419,531 A | * | 5/1995 | Hoehn | 251/122 |
| 5,544,856 A | * | 8/1996 | King et al. | 251/65 |
| 6,293,514 B1 | * | 9/2001 | Pechoux et al. | 251/122 |

FOREIGN PATENT DOCUMENTS

JP    03-113183 A    5/1991

* cited by examiner

*Primary Examiner*—John Bastianelli
(74) *Attorney, Agent, or Firm*—Birch, Stewart, Kolasch & Birch, LLP

(57) ABSTRACT

An electromagnetic control valve having a permanent magnet and a needle are fitted in a cylindrical valve body, and a coil, and first and second yokes are mounted on an outside circumferential surface of the valve body. There are first and second ports in the valve body for making an outside space and an inside space of the valve body in communication. There is an orifice in the valve body for making the first and the second ports in communication. The needle is disposed at a position opposite to a side of the orifice, for moving in an up/down direction when a current is applied to the coil. Direction and amount of movement of the needle are dependent on a direction and an intensity of the current applied to the coil. When the needle moves, a tip of the needle varies an opened area of the orifice linearly, according to which a flow rate of the fluid passed through the orifice is controlled according to a position of the needle.

44 Claims, 17 Drawing Sheets

ELECTROMAGNETIC CONTROL VALVE

This application claims the benefit of the Korean Application Nos. P2003-45729, and P2003-45730, both filed on Jul. 7, 2003, which are hereby incorporated by reference.

BACKGROUND OF THE INVENTION

1. Field of the Invention

The present invention relates to control valves for controlling fluid flow in a tube, and more particularly, to an electromagnetic control valve in which a needle operable with an electromagnetic force is used for shutting off, or controlling fluid flow.

2. Background of the Related Art

In general, the control valve makes a linear control of an opening of an orifice for controlling a flow rate of a fluid flowing therethrough. In general, for making the linear control, a needle with a tapered tip is frequently used. In the valve, the needle is mounted such that the needle can make a linear reciprocating movement in a state the tapered tip of the needle is disposed opposite to one side of the orifice. When the needle makes the linear movement, an opened area of the orifice occupied by the tapered tip of the needle increases/decreases, according to which the flow rate of the fluid passing through the orifice can increase/decrease.

The valve for controlling a fluid flow according to the foregoing principle may have different structures for making the linear movement of the needle. A few related art structures used presently will be described.

As a related art exemplary control valve used up to now, there is a system in which a step motor is used as an actuator that moves the needle. In this case, there are a gear mounted on a rotation shaft of the step motor for converting a rotating motion into a linear motion, and the needle engaged with the gear. In this system, the needle moves in proportion to a number of pulses of a driving power provided to the step motor.

However, such a step motor system has disadvantage in that the valve cost is high due to the expensive step motor. Moreover, the requirement of hermetic sealing between the rotation shaft of the step motor and a valve body the needle is disposed therein causes difficulty in assembly of the valve, and a high production cost.

As another exemplary related art control valve used up to now, there is a system in which a diaphragm or a membrane is used. In this case, the needle is connected to the diaphragm or the membrane, and on a rear side of the diaphragm or the membrane to which the needle is connected, there is a separate space a pressure therein can be controlled by pressurizing the space with a fluid filled therein. This structure facilitates deformation of the diaphragm or the membrane by using expansion of the fluid caused by heating the fluid, according to which the needle can be moved.

However, this structure has disadvantages in that fabrication of a small sized valve is difficult due to the separate pressurizing space, and a great power consumption due to heat. Moreover, the structure has a low valve response speed as the valve is moved indirectly by using the expansion caused by heating of the pressurizing space.

SUMMARY OF THE INVENTION

Accordingly, the present invention is directed to an electromagnetic control valve that substantially obviates one or more of the problems due to limitations and disadvantages of the related art.

An object of the present invention is to provide a control valve, which can control a flow rate.

Another object of the present invention is to provide a control valve, which has a fast valve response speed and good performance by using an electromagnetic force.

Further object of the present invention is to provide a control valve, which has a simple structure and is easy to assemble to have a good productivity.

Still further object of the present invention is to provide a control valve, which is small.

Additional features and advantages of the invention will be set forth in the description which follows, and in part will be apparent to those having ordinary skill in the art upon examination of the following or may be learned from practice of the invention. The objectives and other advantages of the invention will be realized and attained by the structure particularly pointed out in the written description and claims hereof as well as the appended drawings.

To achieve these objects and other advantages and in accordance with the purpose of the present invention, as embodied and broadly described herein, the electromagnetic control valve includes a valve body, a permanent magnet, a coil, a first yoke, and a needle.

The valve body has first and second ports for communicating an inside and an outside of the valve, an orifice inside thereof for making the first and the second ports in communication, and a space inside of an upper part thereof. The permanent magnet is fitted in the space to be movable in an up/down direction, and the coil connected to a circuit and wound on an outside circumferential surface of the valve body.

The first yoke is fitted to surround the outside circumferential surface of the valve body at a position opposite to an upper part of the permanent magnet for sustaining a levitated state of the permanent magnet by a magnetic force. The needle has a tapered tip disposed at a position opposite to a side of the orifice, for making linear variation of an opened area of the orifice while the needle moves together with the permanent magnet when the permanent magnet moves up or down by an electromagnetic force generated when a current is applied to the coil.

In the meantime, the valve body has a long cylindrical form disposed in the up/down direction, and includes detachable three pieces.

The electromagnetic control valve of the present invention can be embodied as the following two embodiments.

In the first embodiment of the present invention, the first port is formed in a bottom of the valve body, and the second port is formed in a point of the outside circumferential surface of the valve body. It is preferable that the first port and the second port are formed in a vertical direction to each other.

In the first embodiment, the valve body includes three pieces, wherein a first piece has the outside circumferential surface the coil and the first yoke joined thereto, and an inside the permanent magnet held therein. The second piece has an outside circumferential surface with the second port formed therein, an opened bottom, and a cavity formed therein for positioning the needle therein when the second piece is connected to the bottom of the first piece. The third piece has the orifice formed therein, connected to a bottom of the second piece to dispose the needle at a position opposite to the orifice. In the first embodiment, the first piece is formed of a nonmagnetic substance.

In the second embodiment of the present invention, the first port is formed in the bottom of the valve body, and the second port is formed in a top of the valve body. In the second embodiment, it is preferable that the permanent magnet includes at least one vertical flow passage to make the second port and the orifice in communication. The permanent magnet preferably includes a plurality of flow passages formed in a radial direction.

It is preferable that the second embodiment also has three piece valve body. The first piece has the second port formed in a top thereof, the outside circumferential surface the coil and the first yoke joined thereto, and an inside the permanent magnet held therein. The second piece has opened top and bottom, an outside circumferential surface with the coil wound on a part thereof, and a cavity formed therein for positioning the needle therein when the second piece is connected to the bottom of the first piece. The third piece has the orifice formed therein, connected to a bottom of the second piece to dispose the needle at a position opposite to the orifice. In the second embodiment, it is preferable that the first and second pieces are formed of a nonmagnetic substance, and the first port and the second port are formed on a straight line.

In the meantime, in the electromagnetic control valve of the present invention, the valve body includes a cap detachably fitted thereto. In this case, though the cap is closed in the first embodiment, in the second embodiment, the second port is formed in a central part of the cap in the up/down direction. The cap is formed of a nonmagnetic substance.

The electromagnetic control valve of the present invention further includes a limiter fitted between the cap and the permanent magnet for reducing a horizontal sectional area of the space to limit a moving up height of the permanent magnet. The limiter has a ring form with an inside diameter smaller than an outside diameter of the permanent magnet. It is preferable that the limiter is formed of a nonmagnetic substance.

In the electromagnetic control valve of the present invention, it is preferable that the first yoke is formed of a substance having a high permeability.

In the meantime, the control valve may further include a second yoke mounted on the outside circumferential surface of the valve body to surround the coil. The second yoke is formed of a substance having a high permeability. The second yoke may include an upper piece mounted to enclose the upper part of the coil, and a lower piece mounted to enclose the lower part of the coil.

In the electromagnetic control valve of the present invention, the needle may be connected to a lower part of the rod fitted to pass the permanent magnet, for moving together with the permanent magnet, or to the permanent magnet directly. If the rod is provided, the rod is formed of a nonmagnetic substance.

The control valve may further include at least one spring fitted such that parts thereof fastened to the valve body and the rod for preventing the permanent magnet, the rod, or the needle come into contact with an inside wall of the valve body, and providing a restoration force for the permanent magnet to restore to an original position, when the permanent magnet moves.

The spring may include a first spring for supporting an upper part of the rod passed through the permanent magnet, and a second spring for supporting a lower part of the rod connected to the needle. The first or second spring may include a first ring fastened to the valve body, a second ring inside of the first ring having an inside circumference an outside circumference of the rod is inserted therein, and suspenders connected between the first ring and the second ring each having a great stiffness in a radial direction of the first ring and an elasticity in an up/down direction of the first ring. It is preferable that the springs are formed of a nonmagnetic substance.

In the meantime, in the electromagnetic control valve of the present invention, the needle may be disposed to close the orifice in a state no current is applied to the coil, or to open the orifice fully in a state no current is applied to the coil, and the tip may be disposed to occupy a portion of the opened area of the orifice in a state no current is applied to the coil. Those structural changes can be implemented easily by adjusting a height of fore part of the first yoke that fixes an initial height of the permanent magnet.

In the electromagnetic control valve of the present invention, the electric circuit may be a circuit that can control intensity and a direction of the current applied to the coil as required so that the needle can linearly increase/decrease the opened area of the orifice. In this case, it is preferable that the electric circuit includes a PWM circuit (pulse width modulation circuit) that can control digitized frequency and pulse width of an applied current as required.

Different from this, the electric circuit may be a circuit that can apply a current of a preset intensity to the coil so that the needle opens or closes the orifice as a bistable on/off valve.

In the meantime, the first port may have an inlet tube for introducing a high pressure fluid thereto, and the second port may have an outlet tube for discharging a fluid passed through the orifice. In this case, it is preferable that the orifice has a diameter smaller than a diameter of the first port for dropping pressure and temperature of the fluid after the fluid passes the orifice. Opposite to this, the second port may have an inlet tube for introducing a high pressure fluid thereto, and the first port may have an outlet tube for discharging a fluid passed through the orifice.

In the electromagnetic control valve of the present invention, the fluid introduced into the valve body, passes through the orifice, and discharged to an outside of the valve may be in a gas state, in a liquid state, or in a gas and liquid mixed state. Moreover, the fluid may be a super critical fluid.

It is to be understood that both the foregoing description and the following detailed description of the present invention are exemplary and explanatory and are intended to provide further explanation of the invention claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings;

FIGS. 3A~3C illustrate partially disassembled perspective views of the control valve in FIG. 2, wherein, FIG. 3A illustrates a disassembled perspective view showing components substantially in an upper part of an inside of a valve body, FIG. 3B illustrates a disassembled perspective view showing components substantially in a lower part of an inside of a valve body, and FIG. 3C illustrates a disassembled perspective view showing a valve body with components fitted inside and outside thereof;

FIGS. 4A and 4B illustrate vertical lengths of first yokes and positions of needles in a case the valve in FIG. 2 is fabricated as a normal open type or a normal close type valve, wherein, FIG. 4A illustrates a normal open type valve in which a needle is left open an orifice when no current is provided, and FIG. 4B illustrates a normal close type valve in which a needle is left close an orifice when no current is provided;

FIGS. 7A~7C illustrate partially disassembled perspective views of the control valve in FIG. 5, wherein, FIG. 7A illustrates a disassembled perspective view showing components substantially in an upper part of an inside of a valve body, FIG. 7B illustrates a disassembled perspective view showing components substantially in a lower part of an inside of a valve body, and FIG. 7C illustrates a disassembled perspective view showing a valve body with components fitted inside and outside thereof;

FIGS. 8A and 8B illustrate vertical lengths of first yokes and positions of needles in a case the valve in FIG. 2 is fabricated as a normal open type or a normal close type valve, wherein, FIG. 8A illustrates a normal open type valve in which a needle is left open an orifice when no current is provided, and FIG. 8B illustrates a normal close type valve in which a needle is left close an orifice when no current is provided;

FIGS. 11A~11B illustrate perspective views each showing a relation between an induction field Bu or Bd formed according to a direction of current in a coil versus an induced electromotive force Fu or Fd applied to a permanent magnet, wherein, FIG. 11A illustrates a case when the current is applied to the coil in an anti-clockwise direction when the drawing is seen from above, and FIG. 11B illustrates a case when the current is applied to the coil in a clockwise direction when the drawing is seen from above.

DETAILED DESCRIPTION OF THE PREFERRED EMBODIMENT

Figure 1:
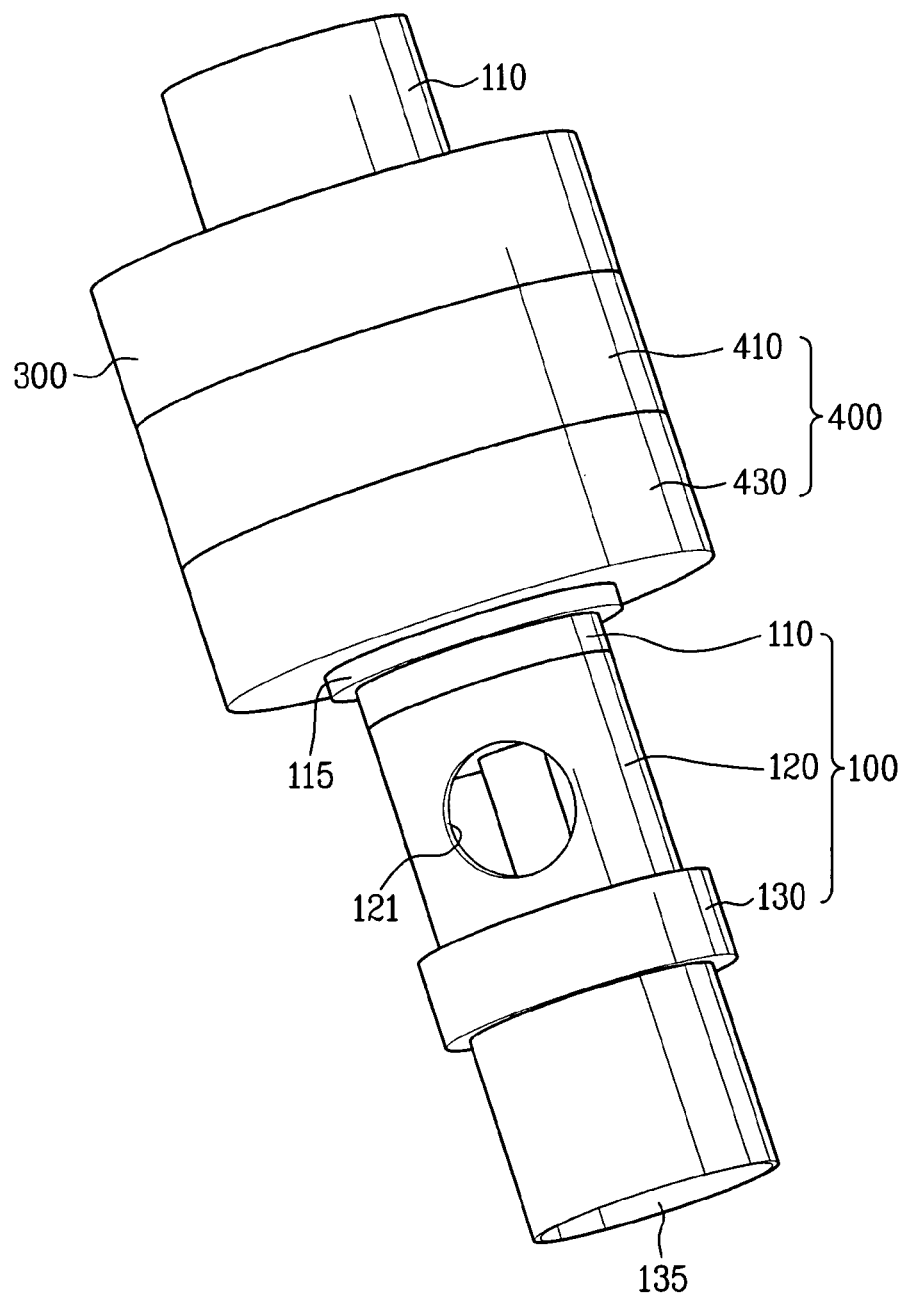
FIG. 1 illustrates a perspective view of an electromagnetic control valve in accordance with a first preferred embodiment of the present invention.

Reference will now be made in detail to the preferred embodiments of the present invention, examples of which are illustrated in the accompanying drawings. In the following description, two embodiments of the present invention will be introduced, which differ in positions of inlet/outlet ports and valve body structures. For reference, as the two embodiments are very similar, after description of the first embodiment, only description of second embodiment that is different from the first embodiment will be given. Accordingly, in describing the two embodiments, same parts will be given the same names and reference symbols, and repetitive description of which will be omitted.

Moreover, for convenience of description, a longitudinal direction of the valve shown in the drawing will be called as an up/down direction or a vertical direction, and a diametric or a width direction of the valve is called as a horizontal direction. For brevity of the drawing, threads for fastening the components are not shown.

The first embodiment of the present invention will be described with reference to FIGS. 1~4B. For reference, FIG. 1 illustrates a perspective view of an electromagnetic control valve in accordance with a first preferred embodiment of the present invention, FIG. 2 illustrates a perspective view of a section of the control valve in FIG. 1, FIGS. 3A~3C illustrate partially disassembled perspective views of the control valve in FIG. 2, wherein FIG. 3A illustrates a disassembled perspective view showing components substantially in an upper part of an inside of a valve body, FIG. 3B illustrates a disassembled perspective view showing components substantially in a lower part of an inside of a valve body, and FIG. 3C illustrates a disassembled perspective view showing a valve body with components fitted inside and outside thereof.

Figure 2:
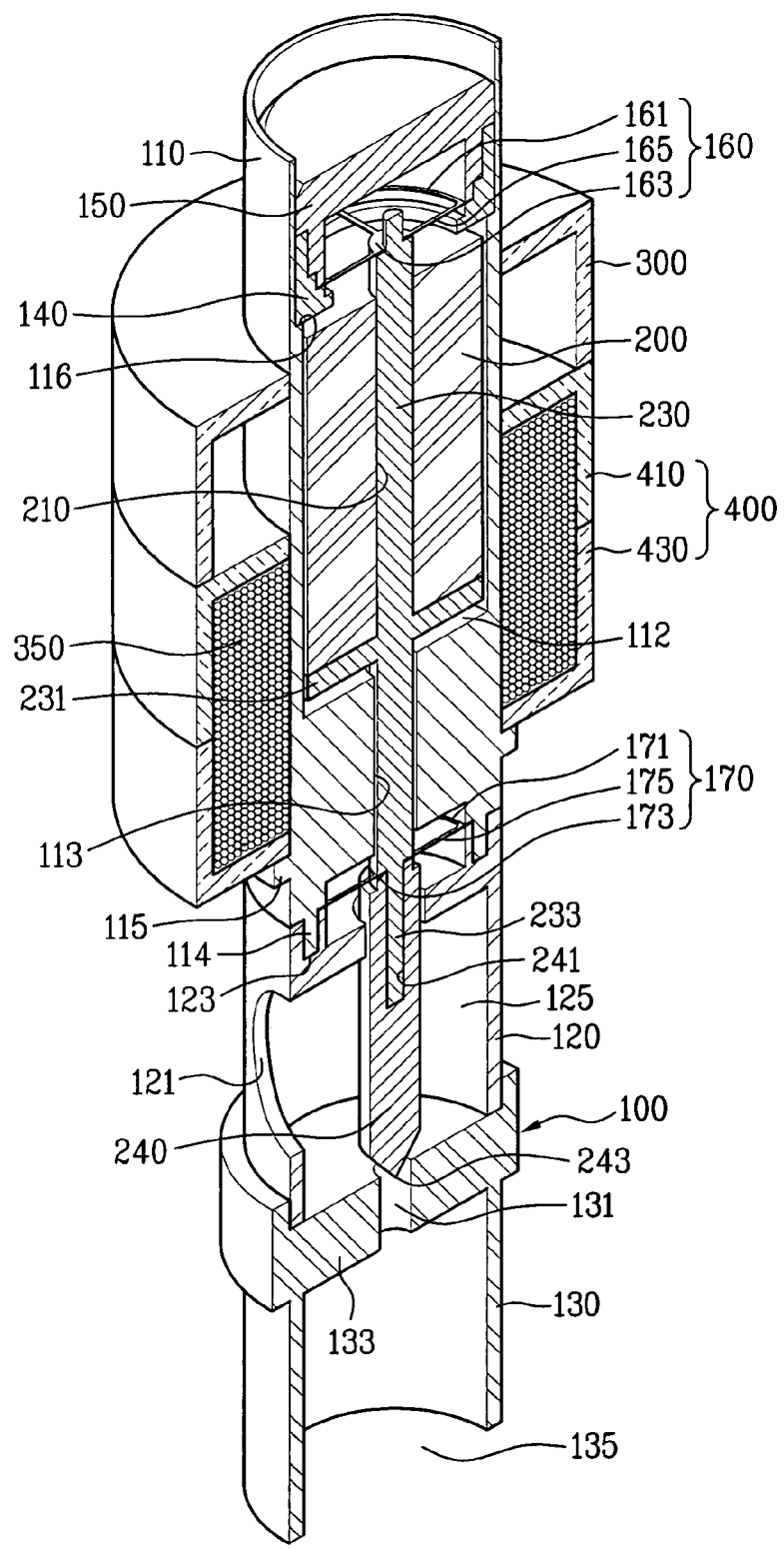
FIG. 2 illustrates a perspective view of a section of the control valve in FIG. 1.
Figure 3A:
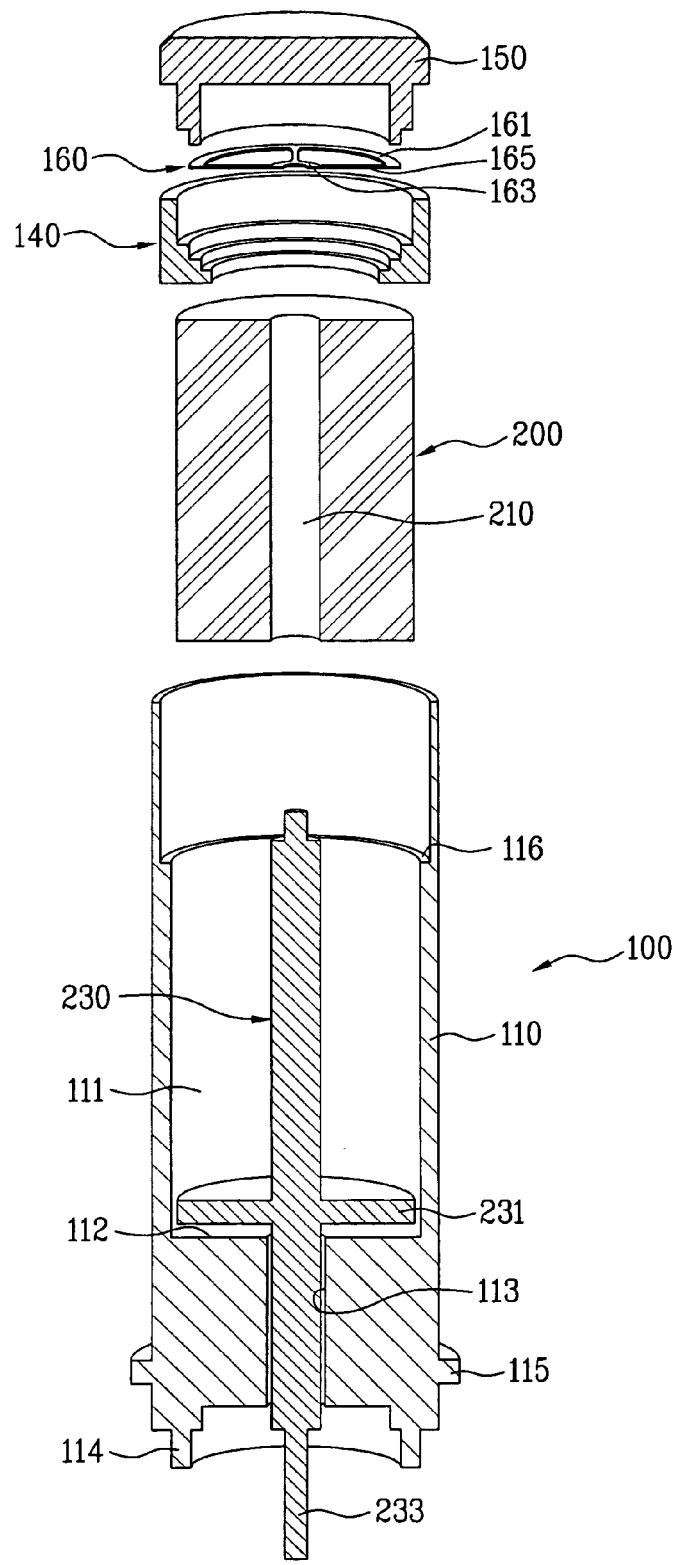
Figure 3B:
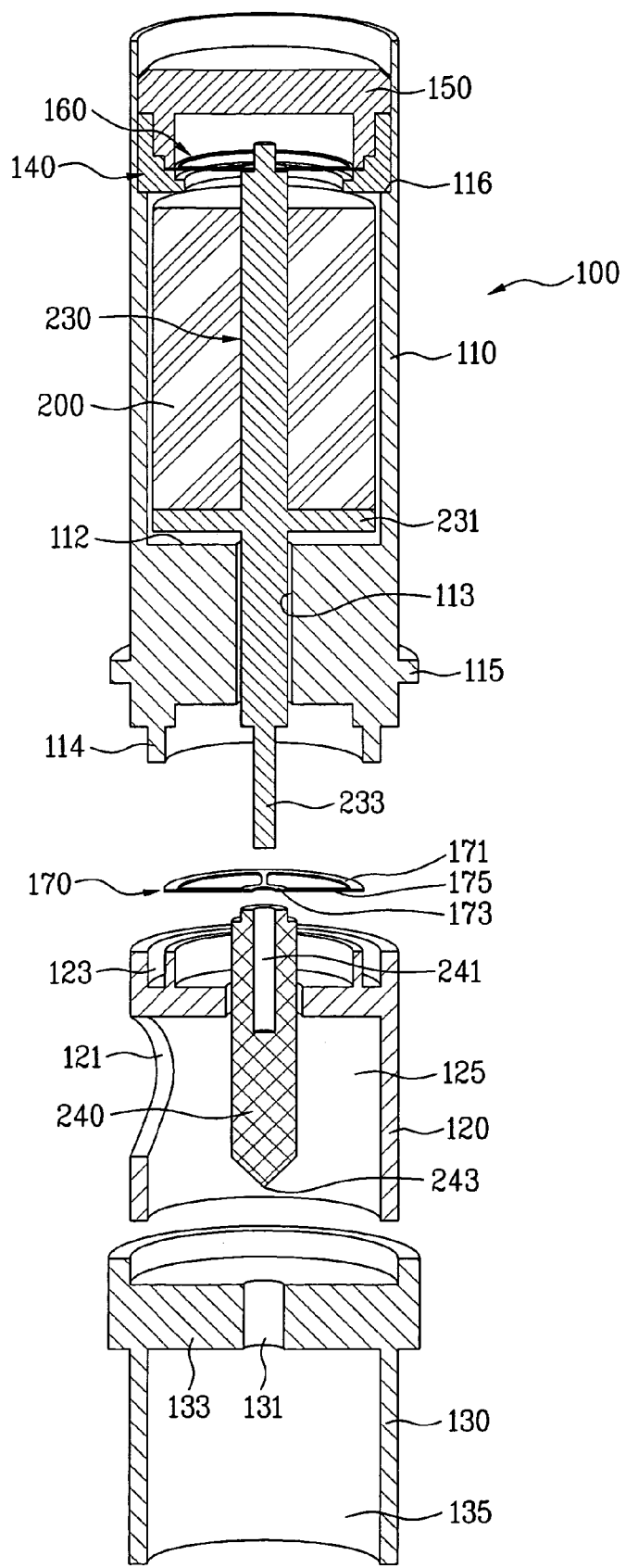
Figure 3C:
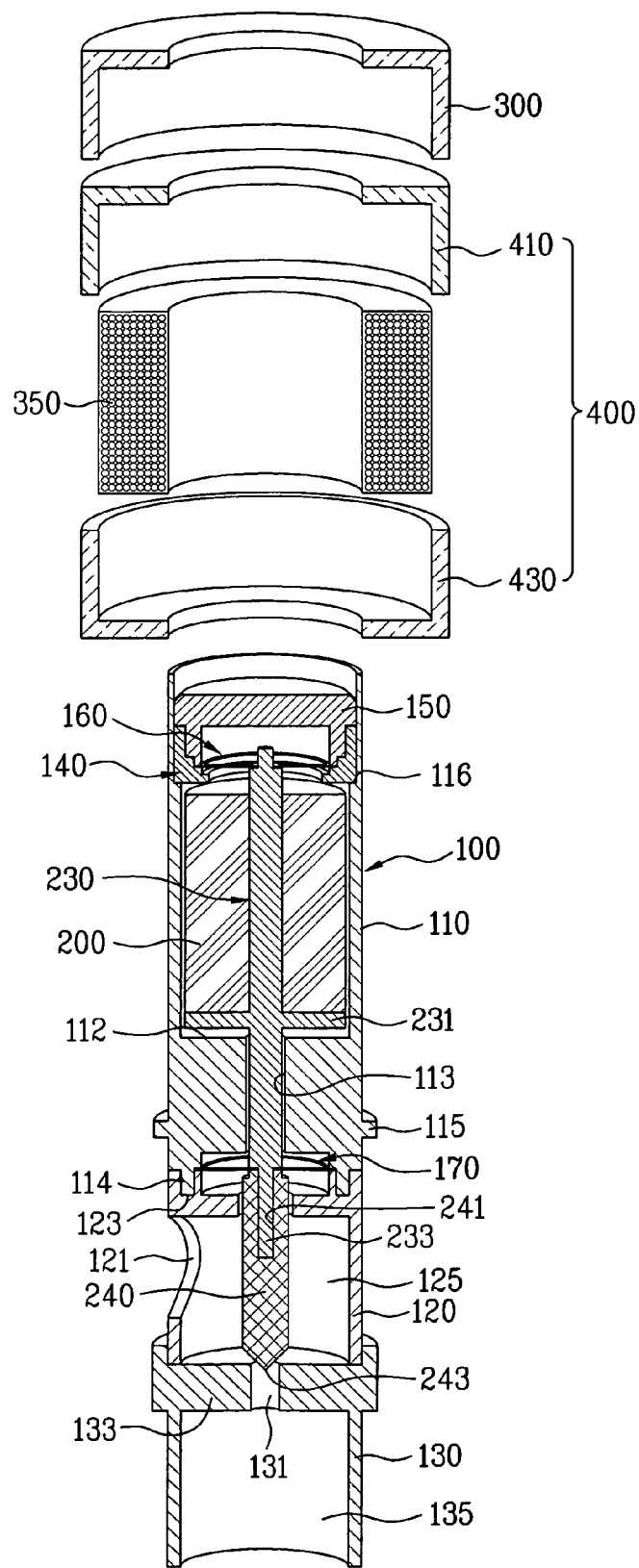

Referring to FIGS. 1 and 2, the electromagnetic control valve includes a cylindrical valve body 100, a permanent magnet 200 and a needle 240 in the valve body 100, and a coil 350, a first yoke 300, and a second yoke 400 on an outside circumference of the valve body 100. The needle 240 is connected to a rod 230 passed through the permanent magnet 200. The valve body 100 has two ports, i.e., a first port 135, and a second port 121, for communication between an exterior and interior of the valve body 100.

The valve body 100 has an orifice 131 therein for communication between the first and second ports 135 and 121. The needle is fitted opposite a side of the orifice 131 so as to be movable in an up/down direction in an inside of the valve body 100 together with the permanent magnet 200 when a current is provided to the coil 350. A direction and displacement of the needle 240 are dependent on a direction and intensity of the current provided to the coil 350.

In the meantime, there is at least one spring 160 and 170 in the valve body 100 for supporting the rod 230 so that the rod 230 guides the needle 240 smoothly when the needle 240 moves in an up/down direction. When the needle 240 moves, the tip 243 of the needle 240 linearly varies an open area of the orifice 131 such that a flow rate of a fluid, which is introduced into the valve body 100 through one of the first and second ports 135 and 121, passed through the other port, and discharged to an exterior, is controlled according to a position of the needle 240.

Referring to FIGS. 1 and 2, the cylindrical valve body 100 is long and fitted in an up/down direction. However, a form of the valve body 100 is not limited to the cylindrical form, but any form is viable as far as the form facilitates winding of the coil 350 on an outside circumference, and has a space for fitting, starting from the permanent magnet 200, different components therein.

There are different components fitted to an inside of the valve body 100. Therefore, it is preferable that the valve body 100 has a structure in which the different components can be fitted to an inside of the valve body 100 easily and permits an easy assembly. For this, as shown in FIGS. 3A~3C, it is preferable that the valve body 100 has a plurality of pieces, for an example, three pieces. After being fabricated individually, the three pieces may be joined as one valve body 100, by a method, such as screw fastening, welding, brazing, press fit and the like. Hereafter, a piece in an upper part of a longitudinal direction of the valve is called as a first piece 110, a piece in an intermediate part thereof is called as a second piece 120, and a piece in a lower part thereof is called as a third piece 130.

Referring to FIG. 3A, the first piece 110 is cylindrical, with opened top and bottom. The first piece 110 has a fasting part, such as thread (not shown) at the bottom for fastening to the second piece 120. There is a detachable cap 150 on the opened top of the first piece 110. Therefore, the opened top of the first piece 110 is closed with the cap 150. The cap 150 may be joined to the first piece 110 with welding, press fit, or threads. As shown in FIG. 3A, the first piece 110 has a space 111 therein for holding the permanent magnet 200. Of the inside of the first piece 110, there is a step 112 in a low side of the space 111 projected from an inside wall of the first piece 110 in a radial direction of the first piece 110 for supporting a bottom of the permanent magnet 200. Accordingly, there is a long hole 113 formed inside of the first piece 110 making the space 111 and an outside space of a lower side of the first piece 110 in communication, in which the rod 230 is fitted along an axis of the first piece 110. On an outside circumference to the first piece 110, there is the coil 350 and the first yoke 300 fitted thereto, which will be described, later.

Referring to FIG. 2 and 3B, the second piece 120 is joined to the bottom of the first piece 110 with welding, brazing, press fit, or threads. For this, in top or the second piece 120, there is another threads matched to the threads on the first piece 110, or a fastening part required for welding or press fit is formed. In the present invention, a structure is suggested, in which the first piece 110 and the second piece 120 can be joined in a state the first piece 110 and the second piece 120 have a stronger air tightness, which will be described, below.

Referring to FIGS. 3A and 3B, the first piece 110 has an annular projection 114 on the bottom. A thread may be formed at least one of outside and inside circumferential surfaces of the projection 114. As shown in FIG. 3B, the second piece 120 has an annular groove 123 for receiving the projection 114. The groove 123 may have another thread matched to the thread on the projection 114. Above structure permits the first piece 110 and the second piece 120 are joined in a state the first piece 110 and the second piece 120 have a stronger air tightness. If required, sealant or 0-ring may be inserted in the annular groove for better air tightness.

The second piece 120 is also cylindrical, with opened top and bottom. The second piece 120 has a cavity 125 formed therein for fitting, and up/down direction movement of the needle 240. As shown in FIGS. 1 and 2, the second piece 120 has the second port 121 in one point of an outside circumferential surface. Therefore, the second port 121 makes the cavity 125 in communication with an outside space of the second piece 120. The second piece 120 has a thread for fastening to, or a fastening part required for welding or press fit, to the third piece 130, on a bottom, for an example, lower outside circumferential surface thereof.

The third piece 130 is threaded, welded, or press fit to a bottom of the second piece 120. For this, the third piece 130 has another thread matched to the thread on the second piece 120, or a fastening part required for welding or press fit to the second piece 120, on a top thereof. The third piece 130 has the first port 135 in a bottom for making an inside and outside spaces of the third piece 130 in communication. As shown in FIG. 3B, the first port 135 opens the bottom of the third piece 130, fully. However, a form of the first port 135 is not limited to this, but, if the bottom of the third piece 130 is closed, the first port 135 may be formed in a required size in the closed bottom.

The third piece 130 has the orifice 131 in an inside thereof. It is preferable that the orifice 131, formed in a vertical direction, has a sectional area much smaller than the first port 135. For forming the orifice 131 with a very small sectional area in the third piece 130, the third piece 130 has a divider 133 formed therein for dividing an upper part and a lower part. Therefore, the orifice 131 is formed at a center of the divider 133 in a vertical direction.

Of the valve body 100 having above structure, the first piece 110 is formed of a nonmagnetic substance. Moreover, it is preferable that the second piece 120 and the third piece 130 are also formed of a nonmagnetic substance. It is preferable that the first port 135 and the second port 121 are substantially perpendicular to each other. If formed thus, since a tube (not shown) connected to the first port 135 is perpendicular to tube (not shown) connected to the second port 121, the valve of the present invention can be useful in a case a flow direction of the fluid is changed to a vertical direction. Of course, the first port 135 and the second port 121 may be formed in a direction, other than the perpendicular direction.

In the meantime, the valve body 100 may have a structure other than above structure. Though not shown, the top of the valve body 100 may have no opening, not to require the cap 150. The coil 350 may surround, not only the outside circumferential surface of the first piece 110, but also a part of an outside circumferential surface of the second piece 120. Since such simple structural changes are apparent to persons skilled in this field of art, it is evident that the structures are within the scope of the present invention.

Referring to FIG. 2, the permanent magnet 200 is held in the space 111 in the valve body 100. The permanent magnet 200, magnetized so as to polarize in a vertical direction, is held in the space 111 so as to be movable in up/down direction in a levitated state by the magnetic force. The principle of levitation of the permanent magnet 200 will be described, later.

For the up/down direction movement of the permanent magnet 200 in the space 111, a horizontal sectional area of the permanent magnet 200 is formed smaller than a sectional area of the space 111, and an up/down direction length of the permanent magnet 200 is formed shorter than an up/down direction length of the space 111. In the meantime, the permanent magnet 200 has a through hole 210 in the up/down direction for pass of the rod 230. If the valve body 100 is cylindrical, the permanent magnet 200 is also cylindrical, and, as shown in FIG. 3A, the through hole 210 is formed on an axis of the permanent magnet 200.

Referring to FIGS. 2 and 3B, the needle 240 has a tapered tip 243. As shown in FIG. 2, the tip 243 is disposed opposite to one side of the orifice 131. The needle 240, moving together with the permanent magnet 200 when the permanent magnet 200 is moved in the up/down direction by the electromagnetic force, linearly varies an opened area of the orifice 131. For the linear variation of the opened area of the orifice 131 by means of the tip 243 of the needle 240, it is preferable that the tip 243 and the orifice 131 have circular horizontal sectional areas, respectively. In above structure, since the sectional area of the tip 243 varies within the opened area of the circular orifice 131, the opened area of the orifice 131 varies linearly.

If the tip 243 of the needle 240 is inserted in the orifice 131 to a certain extent, the tip 243 occupies a certain area of the opened area of the orifice 131. In this initial state, if the needle 240 moves down such that the tip 243 is inserted in the orifice 131 more, the opened area of the orifice 131 is reduced more than the initial state. If the needle 240 moves up from the initial state, the opened area of the orifice 131 increases more than the initial state.

Referring to FIG. 3B, the needle 240 is connected to a lower end of the rod 230. To do this, the needle 240 has an inserting hole 241 from a top to an inside, and the rod 230 has a pin 233 formed at a lower end for insertion in the insertion hole 241. The pin 233 may be press fit, or threaded in the insertion hole 241.

Referring to FIG. 2, the rod 230 is fitted such that a top of the rod 230 passes the permanent magnet 200, and the lower end of the rod 230 is fixed to the needle 240. The rod 230 may have an outward radial direction extension 231 from an outside surface of the rod 230 for supporting a bottom of the permanent magnet 200. Thus, when the rod 230 has the extension 231, the step 112 on the valve body 100 supports a bottom of the extension 231. Of course, if the extension 231 has a diameter smaller than the hole 113 in the valve body 100, the step 112 supports the bottom of the permanent magnet 200, directly.

The extension 231 from the rod 230, not only supports the bottom of the permanent magnet 200, but also fixes an exact position of the permanent magnet 200 with respect to the rod 230. Accordingly, the extension 231 permits an easy assembly.

In the meantime, in the electromagnetic control valve of the present invention, though not shown, the needle 240 may be engaged with the permanent magnet 200, not via the rod 230, but directly. In this case, the upper part of the needle 240 is formed longer for replacing the rod 230. Since such a simple structural change can be known only with a simple description, the change is not shown on the drawing.

If the needle 240 is engaged with the permanent magnet 200 directly, or via the rod 230, the needle 240 can be displaced as much as the displacement of the permanent magnet 200 when the permanent magnet 200 moves in the up/down direction by the electromagnetic force. In the meantime, it is preferable that the rod 230 and the needle 240, having the foregoing structures, are respectively formed of nonmagnetic substances for preventing the rod 230 and the needle 240 from giving an influence to the magnetic field formed by the permanent magnet 200.

Referring to FIG. 2, the coil 350 is wound on an outside circumferential surface of the valve body 100, for an example, on an outside circumferential surface of the first piece 110. Of course, as shown in FIG. 2, the coil 350 is not wound, not only on the outside circumferential surface of the first piece 110, but also on a part, or entire outside circumferential surface of the second piece 120. As shown in FIGS. 2~3C, for supporting the bottom of the coil 350, the valve body 100, for an example, the first piece 110, has a flange 115 projected outward in a radial direction from a point of an outside circumferential surface.

Referring to FIGS. 2 and 3C, though the flange 115 may support the bottom of the coil 350, if the electromagnetic control valve of the present invention is provided with the second yoke 400, the flange 115 supports a bottom part of the second yoke 400. In the meantime, the flange 115, not only supports the bottom part of the coil 350 or the second yoke 400, but also fixes an exact position of engagement of the coil 350 or the second yoke 400. Therefore, the flange 115 permits an easy assembly.

In the meantime, the coil 350 has an electric circuit (not shown) connected thereto. The electric circuit is connected to the coil 350 for applying a current to the coil 350, which is not shown specifically, because persons in this field of art know the electric circuit is connected to the coil.

The electric circuit may be a circuit that can control an intensity and direction of the current applied to the coil. Then, by fixing the direction of the current applied to the coil 350, a direction of movement of the permanent magnet 200, i.e., upward or downward movement of the permanent magnet 200 can be fixed. Moreover, by controlling the intensity of the current, a distance of movement of the permanent magnet 200 can be controlled. The easy control of the distance of movement of the permanent magnet 200 implies an easy control of the flow rate passing through the orifice 131.

As examples of the circuit that can control the intensity and direction of the current, there are analog current control circuits, pulse width modulation circuits (PWM), and the like. Since the analog current control circuits, and pulse width modulation circuits are widely known presently, detailed description will be omitted. However, for helping understanding, the description will be given briefly. The analog current control circuit is a circuit in which a control voltage pertinent to the direction and an amplitude of the current that corresponds to required displacement of the permanent magnet is applied to the coil, and the pulse width modulation circuit is a circuit in which the intensity of the circuit is controlled by controlling digitized frequency and pulse width of the current. Therefore, it is preferable that the electric circuit connected to the coil 350 includes the analog current control circuit, or the pulse width modulation circuit. However, the electric circuit employed in the present invention is not limited to those, but any circuit may be employed as far as the circuit can control the intensity and direction of the current.

In the meantime, the electric circuit may include a circuit that can apply a current of a preset intensity to the coil 350. In this case, since the coil 350 has a current of fixed intensity applied thereto, displacements of the permanent magnet 200 and the needle 350 are always constant. Once the electric circuit has such a system, the control valve may be operative as a bistable on/off valve in which the needle 240 only opens/closes the orifice 131, merely. Of course, in this case, even if the intensity of the current is fixed, it is preferable that the circuit can change the direction of the current. The technology for changing the current direction to the coil 350 is a generally known old one, description of which will be omitted.

In the present invention, the permanent magnet 200 maintains a levitated state in which the permanent magnet 200 is floated in the space 111 of the valve body 100. For this, referring to FIGS. 1~3C, the first yoke 300 is mounted on the outside circumferential surface of the valve body 100, more specifically, on the outside circumferential surface of the first piece 111. The first yoke 300 is formed of a substance having a high permeability, such as pure iron, for concentration of the magnetic field in the upper part of the permanent magnet 200, and, as shown in FIG. 2, mounted to surround the outside circumferential surface of the first piece 110 opposite to the upper part of the permanent magnet 200. The first yoke 300 is, for an example, cylindrical.

Figure 9:
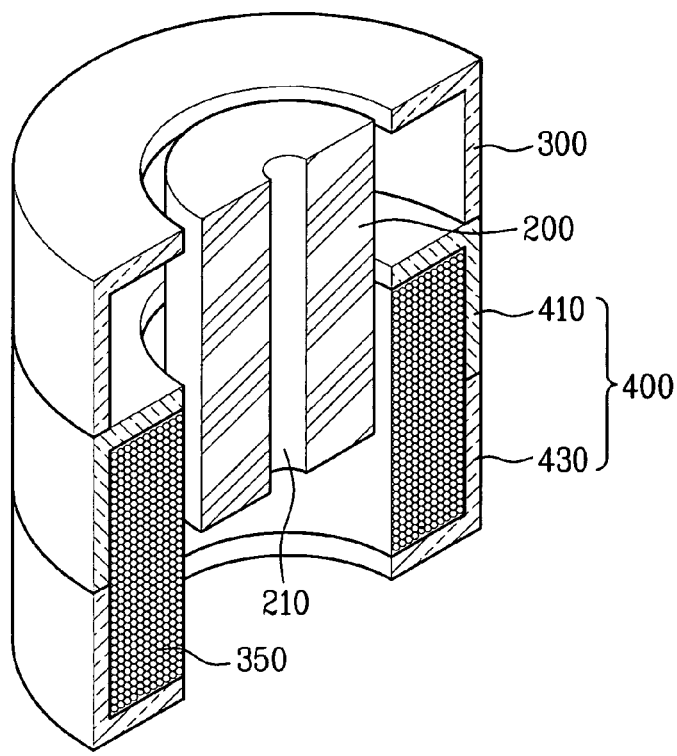
FIG. 9 illustrates a perspective view showing nonmagnetic components removed from valve for showing a principle a permanent magnet levitated by a magnetic force in a valve of the present invention, schematically.

Once the first yoke 300 has a high permeability, the magnetic field in the upper part of the permanent magnet 200 is concentrated to a top of the first yoke 300. Therefore, by the concentrated magnetic field, the permanent magnet 200 is kept in a state the top of the permanent magnet 200 is at the shortest distance to the top of the first yoke 300. According to this, as shown in FIG. 9, the permanent magnet 200 is sustained in a state in which the top of the permanent magnet 200 is levitated by the magnetic force to an altitude the same with the top of the first yoke 300. According to this, even in a stage no current is applied to the coil 350, the needle 240 engaged with the permanent magnet 200 can be sustained in a levitated state in which the needle 240 is floated in the air with a distance to the orifice 131. Moreover, the first yoke 300 provides a force that can change a position of the permanent magnet 200 when the current is applied to the coil 350. This principle will be described in more detail later, with reference to FIGS. 9~11B.

In the meantime, the electromagnetic control valve may further include the second yoke 400. The second yoke 400 further concentrates the magnetic field in the vicinity of the permanent magnet 200, to increase a magnetic flux intensity in the valve body 100. Since the increased magnetic flux density in the valve body 100 strengthens the magnetic force applied to the permanent magnet 200, the permanent magnet 200 does not fall down by gravity, but is sustained in a floated state in the space 111. Moreover, once the second yoke 400 is provided, a design change, such as fabricating a smaller first yoke 300, or the like, is possible.

Alike the first yoke 300, it is preferable that the second yoke 400 is formed of a substance having a high permeability. The second yoke 400 is mounted on the outside circumferential surface of the valve body 100, to surround the coil 350. Preferably, the second yoke 400 is mounted such that a bottom of the second yoke 400 is brought into close contact with the flange 115 on the valve body 100, and the top of the second yoke 400 is brought into close contact with the first yoke 300.

Because the coil 350 is held in the second yoke 400, a structure is required for an easier assembly of the electromagnetic control valve. According to this, as shown in FIGS. 2 and 3, a structure is suggested, in which the second yoke 400 has two pieces. If the second yoke 400 has two pieces, i.e., an upper piece 410 and a lower piece 430, which permits an easier holding of the coil 350 wound on the outside circumferential surface of the valve body 100 inside of the upper piece 410 and the lower piece 430, assembly becomes more easier. In this instance, the upper piece 410 encloses an upper part of the coil 350, and the lower piece 430 encloses a lower part of the coil 350.

In the meantime, in the foregoing electromagnetic control valve of the present invention, the permanent magnet 200, the rod 230, and the needle 240 move in the up/down direction in a floated state by the electromagnetic force. However, if a forming error, and an assembly error which can be taken place in formation, or assembly of components are great, an eccentricity may take place, in which the permanent magnet 200, the rod 230, and the needle 240 fail to move up/down following a vertical axis exactly, but move up/down eccentric from the vertical axis. This eccentricity may cause the permanent magnet 200, the rod 230, and the needle 240 come into contact with an inside wall of the valve body 100, failing an accurate operation, and causing short lifetime coming from wear. Therefore, the present invention suggests a modification for solving the problems.

For solving the foregoing problems, the electromagnetic control valve of the present invention may further include springs 160 and 170 for guiding the components, i.e., the permanent magnet 200, the rod 230, and the needle 240, to move up/down by the electromagnetic force following the vertical axis, accurately. The springs 160 and 170 not only guide the movement of the components, but also provides a restoring force so that the components return to original positions when the components move up or down. It is preferable that the springs 160 and 170 are formed of nonmagnetic substances so that the springs 160 and 170 give no influence to the magnetic field from the permanent magnet 200. Structures of the springs 160 and 170 will be described in more detail, with reference to the attached drawings.

In the present invention, at least one spring 160 and 170 is provided for supporting the rod 230. FIGS. 2 and 3B illustrate an embodiment in which two springs 160 and 170 support the rod 230. For convenience of description, the spring 160 for supporting the upper part of the rod 230 is called as a first spring 160, the spring 170 for supporting the lower part of the rod 230 is called as a second spring 170. The first spring 160 and the second spring 170 have the same structure, and parts of the springs 160 and 170 are fixed to outside circumferential surfaces of the rods 230 and an inside circumferential surfaces of the valve body 100, respectively. For this, the first or second spring 160 or 170 has a first ring 161 or 171 to be fastened to the valve body 100, and a second ring 163 or 173 to be fastened to the rod 230, and a plurality of suspenders 165 or 175 connected between the first ring 161 or 171 and the second ring 163 or 173.

The first ring 161 or 171 has an inside diameter greater than an outside diameter of the second ring 163 or 173. It is adequate if an inside diameter of the second ring 163 or 173 has a size enough to press fit and fix the outside diameter of the rod 230. The first spring 160 and the second spring 170 are fitted at different positions. Therefore, if the rod 230 has different outside diameters at different parts, the inside diameters of the first spring 160 and the second spring 170 may be different from each other. In the meantime, as shown in FIG. 3B, the plurality of the suspenders 165 or 175 are formed between the first ring 161 or 171 and the second ring 163 or 173 in a radial direction, to connect an inside circumference of the first ring 161 or 171 and an outside circumference of the second ring 163 or 173.

In the foregoing springs 160 and 170, the suspenders 165 and 175 have a great stiffness in the radial direction of the first rings 161 and 171 and the second rings 163 and 173 for preventing the second rings 163 and 173 from moving in the radial direction. Then, the rod 230 held in the second rings 163 and 173 also can not move in the radial direction of the first rings 161 and 171 and the second rings 163 and 173, thereby preventing the rod 230, the needle 240, and the permanent magnet 200 from being brought into contact with the inside circumferential surface of the valve body 100. In the meantime, the suspenders 165 and 175 also have elastic forces in the up/down direction of the first rings 161 and 171 and the second rings 163 and 173. Thus, since the second rings 163 and 173 can move in the up/down direction in a state the first rings 161 and 171 are fixed, the up/down direction movement of the rod 230 can be guided effectively. Because the suspenders 165 and 175 are deformed to store elastic energies when the rod 230 moves in the up/down direction, a restoring force can be given to the rod 230 for the rod 230 to return to an original position when the electromagnetic force is removed.

Referring to FIG. 3B, of the foregoing springs 160 and 170, the first spring 160 is fitted to hold the upper part of the rod 230 passed through the permanent magnet 200. For this, the upper part of the rod 230 is inserted in, and held at the second ring 163 of the first spring 160, and, as shown in FIG. 3A, the first ring 161 of the first spring 160 is inserted in, and held at a joined part of the cap 150 and a limiter 140 to be described, later. The second spring 170 is fitted to hold the lower part of the rod 230 connected to the needle 240. For this, as shown in FIG. 3B, the second ring 173 of the second spring 170 is inserted in, and held at a joined part of the rod 230 and the needle 240, and the first ring 171 of the second spring 170 is inserted in, and held at a joined part of the first piece 110 and the second piece 120. The foregoing structure permits a very simple structure and is easy to assemble because no additional components or structures are required for fitting the first and second rings 161 and 171, and 163 and 173 of the first and second springs 160 and 170 to the valve body 100 and the rod 230.

In the meantime, there may be a case, when the current is applied to the coil 350 to move the permanent magnet 200 upward or downward, the permanent magnet 200 moves excessively due to unexpected external reasons. The excessive movement of the permanent magnet 200 may cause permanent deformation of the suspenders 165 and 175 of the springs 160 and 170. Therefore, for securing a more stable performance, it is required to limit the up/down movement of the permanent magnet 200.

For this, referring to FIGS. 2 and 3A, the electromagnetic control valve of the present invention may further include the limiter 140. The limiter 140 reduces a horizontal sectional area of the upper part of the space 111 the permanent magnet 200 is fitted therein, to prevent the permanent magnet 200 from rising any further. The limiter 140, disposed between the space 111 of the valve body 100 and the cap 150 when the cap 150 is fitted, is projected toward an inner side of the valve body 100. The limiter 140 is projected to a length enough to come into contact with the top surface of the permanent magnet 200 when the permanent magnet 200 moves up.

The limiter 140 has a form of a ring with an inside diameter smaller than the outside diameter of the permanent magnet 200. In the meantime, as shown in FIGS. 2~3C, there may be a step 116 on an inside wall of the upper part of the valve body 100 for supporting a bottom, and accurate positioning, of the ring formed limiter 140. However, a form of the limiter 140 is not limited to the ring form, but the limiter 140 may be a simple projection from the inside wall of the valve body 100 to inward. It is preferable that the limiter 140 is also formed of a nonmagnetic substance for giving no influence to the magnetic field of the permanent magnet 200.

The foregoing electromagnetic control valve of the present invention may be of a normal open type in which the orifice 131 is opened fully in a state no current is applied to the coil 350, or of a normal close type in which the orifice 131 is closed fully in a state no current is applied to the coil 350, or, of course, may be of a type in which the orifice 131 is opened partially in a state no current is applied to the coil 350. In order to embody such different types of control valves, an initial position, and a method for fixing the initial position of the needle 240 are very important. The initial position of the needle 240, and structures for fixing the initial position of the needle 240 suggested in the present invention will be described for different valve types, with reference to FIGS. 4A and 4B. For reference, FIGS. 4A and 4B illustrate vertical lengths of first yokes and positions of needles in a case the valve in FIG. 2 is fabricated as a normal open type or a normal close type valve, wherein FIG. 4A illustrates a normal open type valve in which a needle is left open an orifice when no current is provided, and FIG. 4B illustrates a normal close type valve in which a needle is left close an orifice when no current is provided.

Figure 4A:
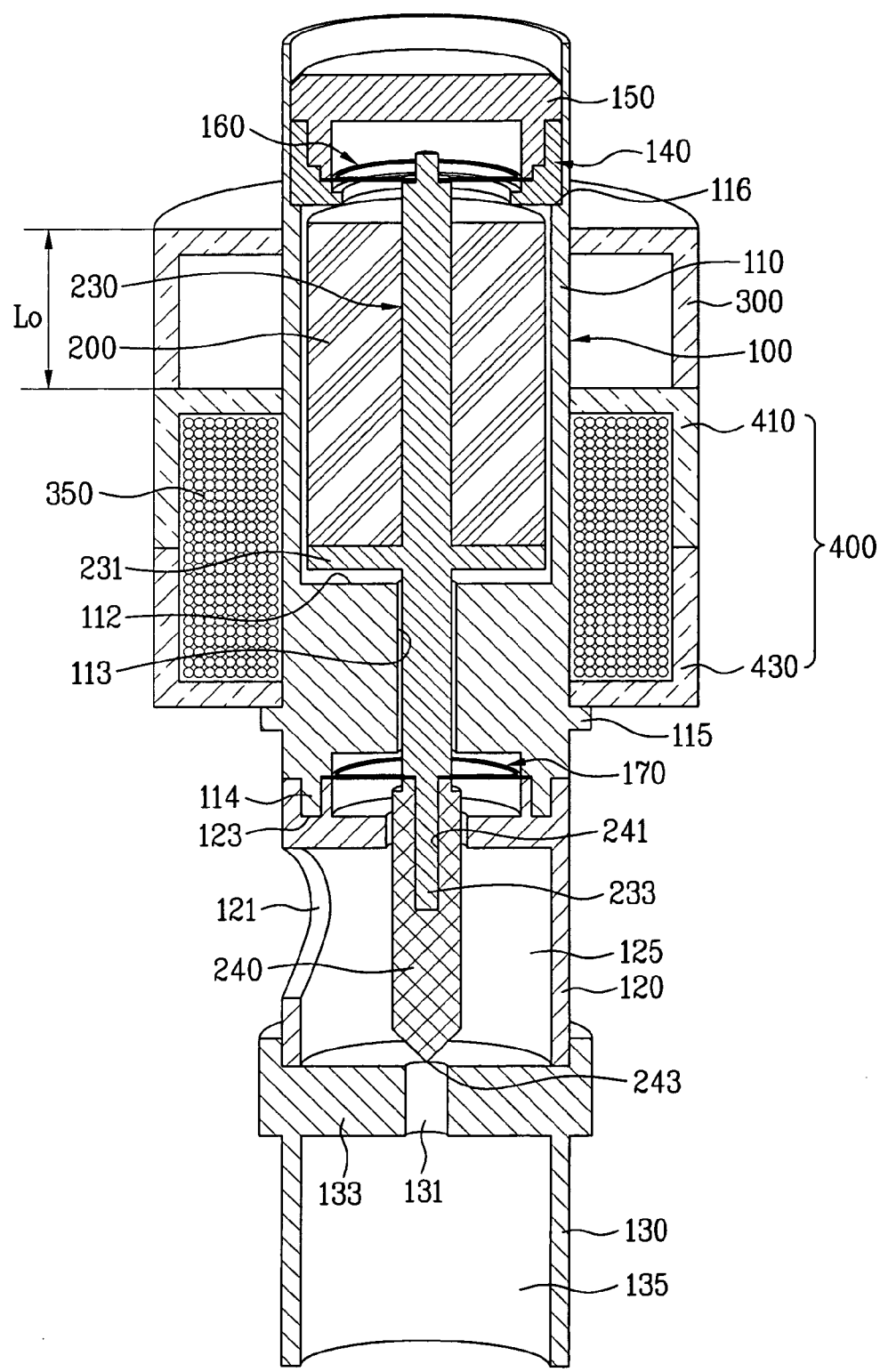

Referring to FIG. 4A, in the normal open type valve, the needle 240 is disposed in a state the tip 243 of the needle 240 is not inserted in the orifice 131. This is made possible by the magnetic force of the permanent magnet 200 and the supporting forces from the springs 160 and 170. Since this principle is described already, no more description will be given. Referring to FIG. 4B, in the normal close type valve, the tapered tip 243 of the needle 240 is disposed to be in close contact with an opening of the orifice 131, fully.

For the different disposition of the initial position of the needles 240 in a state no current is applied to the coil 350, different structures are required. As shown in FIGS. 4A and 4B, of the different structures, the simplest structures having a least difference can be provided by varying the length of the first yoke 300. That is, in different two control valves, when windings of the coils 350 are identical, if the lengths from the top of the coil 350 to the top of the first yoke 300 are different, the initial positions of the needles 240 can be different from each other. This will be described further.

Figure 4B:
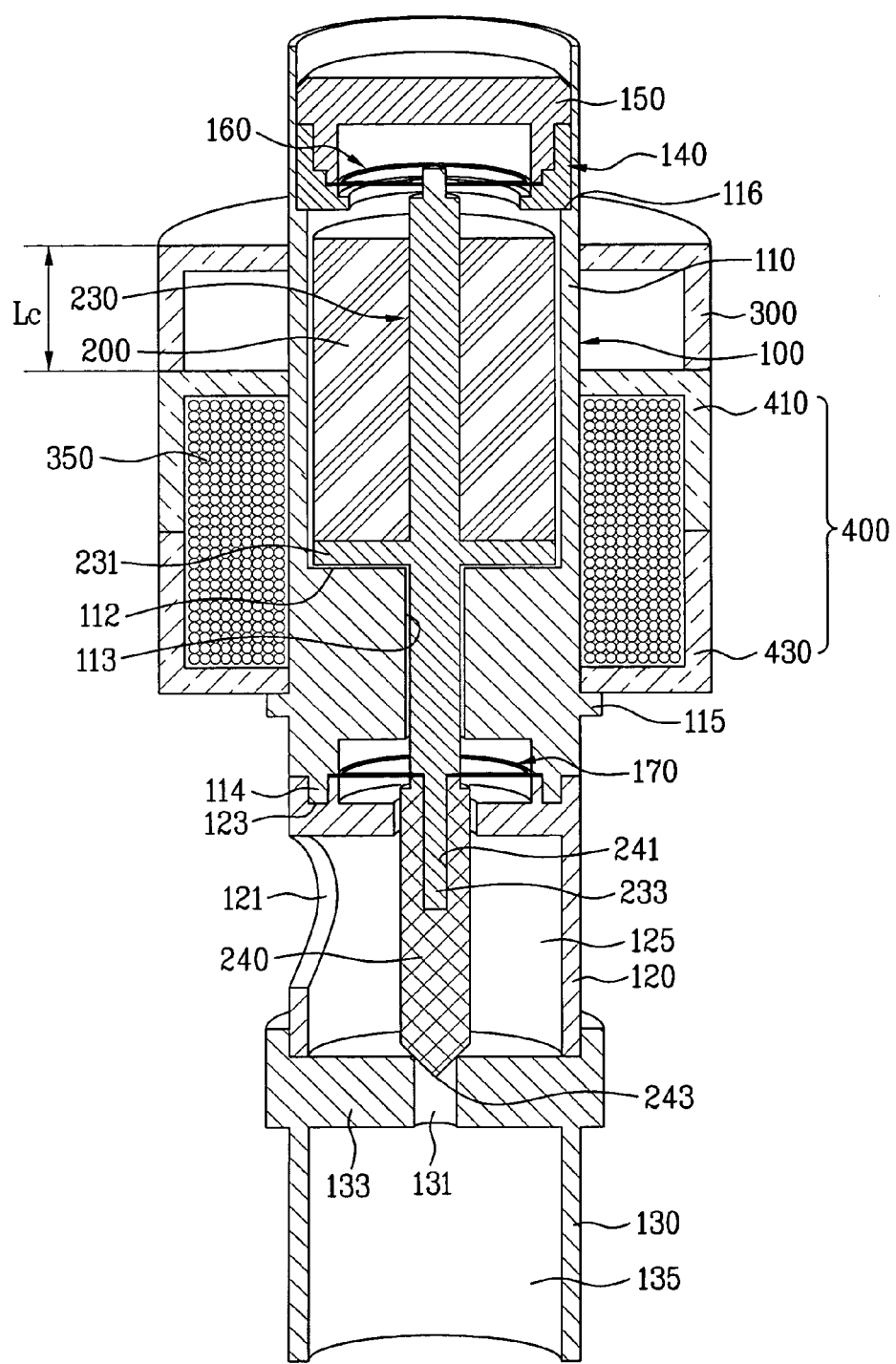

FIGS. 4A and 4B may be compared, to notice that an up/down direction length Lo of the first yoke 300 of the control valve in FIG. 4A is longer than the up/down direction length Lc of the first yoke 300 of the control valve in FIG. 4B. This implies that the top of the first yoke 300 in FIG. 4A has an altitude higher than the first yoke 300 in FIG. 4B. Accordingly, in FIG. 4A, the magnetic field is concentrated at a higher position, to make the permanent magnet 200 to float to a higher position, to dispose the needle 240 at a higher position. Opposite to this, in FIG. 4B, the magnetic field is concentrated at a lower position, to make the permanent magnet 200 to float to a lower position, to dispose the needle 240 at a lower position.

Referring to FIGS. 4A and 4B, in the same principle, in a case sizes of all components are identical except the first yokes 300, with a very simple structural change of changing the up/down direction length of the first yoke 300, the normal open type valve or the normal close valve can be embodied very easily. Of course, if the up/down direction length of the first yoke 300 is designed properly, a state the needle 240 is slightly inserted in the orifice 131 can be maintained. Different from above, by changing the up/down direction length of the rod 230 or the needle 240, the initial position of the needle 240 may be fixed.

In the foregoing electromagnetic control valve of the present invention, tubes (not shown) are connected to the first port 135 and the second port 121, respectively. If the tube connected to the first port 135 is called as a first tube (not shown), and the tube connected to the second port 121 is called as a second tube, one of the first and second tubes serves as an inlet tube for introducing a fluid thereto, and the other one serves as an outlet tube for discharging the fluid therefrom.

For an example, if a high pressure fluid is introduced into the valve body 100 through the first tube, passes through the orifice 131, and is discharged through the second tube, the first tube serves as the inlet tube, and the second tube serves as the outlet tube. Of course, in this instance, the first port 135 serves as an inlet port and the second port 121 serves as an outlet port. Opposite to this, if the high pressure fluid is introduced into the valve body 100 through the second tube, passes through the orifice 131, and discharged through the first tube, the first tube and the first port 135 serve as the inlet tube and the inlet port, and the second tube and the second port 121 serve as the discharge tube and the discharge port.

In the meantime, the present invention suggests a structure in which a high pressure and high temperature fluid is involved in temperature and pressure drop after the fluid passes through the orifice 131. For this, a diameter of the orifice 131 is formed smaller than a diameter of the first port 135. This structure permits a rapid pressure and temperature drop as the high pressure and high temperature fluid introduced through the second port 121 passes through the orifice 131, and is discharged into a large space, to expand adiabatically. In the meantime, of course, the cavity 125 in the second piece 120 the needle 240 is therein has a diameter greater than a diameter of the orifice 131. Therefore, even in a case the high pressure and high temperature fluid is introduced through the first port 135, the fluid involved in temperature and pressure drop as the fluid passes through the orifice 131 to expand adiabatically.

There are a variety of fluids that can be introduced into the valve body 100, pass through the orifice 131, and can be discharged to an outside of the valve body 100. As an example, in the fluids, there are gas state fluids, liquid state fluids, and fluids the gas and the liquid are mixed therein. Moreover, there are super critical fluids of which range of application becomes wider as researches are progressed, recently. For better understanding, the super critical fluid is described, briefly. If a pressure and a temperature exceeding critical values are applied to a fluid, the fluid undergoes a state change into a state in which a difference of gas and liquid is not distinctive. In this state, even if a pressure higher than the present pressure is applied, the fluid is changed, not into a liquid, but into a non-condensable gas. This state is called as a super critical state, and a flux of this state is called as the super critical fluid. The super critical fluid has a density similar to a liquid, a viscosity close to a gas, and a diffusion coefficient one hundred times greater than the liquid.

In the meantime, the foregoing electromagnetic control valve of the present invention is assembled as follows. At first, the rod 230 and the permanent magnet 200 are joined together. Then, the permanent magnet 200 is inserted in, and fitted to, the first piece 110 of the valve body 100. After the permanent magnet 200 is fitted, the limiter 140 and the first spring 160 are inserted into an inside of the upper part of the first piece 110 in succession, and the cap 150 is put on the first piece 110. Above process can be known easily once FIG. 3A is referred to.

Next, after the second ring 173 of the second spring 170 is inserted in the lower part of the rod 230, the needle 240 is connected to the lower part of the rod 230. Then, the second piece 120 and the first piece 110 are put together and fastened. Then, the first ring 171 of the second spring 170 is firmly fastened between the first piece 110 and the second piece 120, which are joined together with threads, welding, or press fit, and the second ring 173 of the second spring 170 is engaged with, and held at the lower part of the rod 230. Then, the third piece 130 is connected, and fixed to, a bottom of the second piece 120. Above process can be known easily, with reference to FIG. 3B.

Once assembly of the valve body 100 and the components to be fitted to an inside of the valve body 100 is finished, the coil 350 and the second yoke 400 are mounted on the outside circumferential surface of the valve body 100. Then, the first yoke 300 is mounted on the outside circumferential surface of the valve body 100 on the second yoke 400. Above process can be known easily, with reference to FIG. 3C. Thus, as the electromagnetic control valve of the present invention has very simple structure, the assembly is very easy.

An electromagnetic control valve in accordance with a second preferred embodiment of the present invention will be described. As described before, the second preferred embodiment will be described in light of difference from the first preferred embodiment. For description of the second embodiment not given in the following description, refer to description of same parts that have same reference symbols given in the description of the first embodiment. For reference, FIGS. 5~8B illustrating the second embodiment corresponds to FIGS. 1~4B illustrating the first embodiment, respectively.

Figure 5:
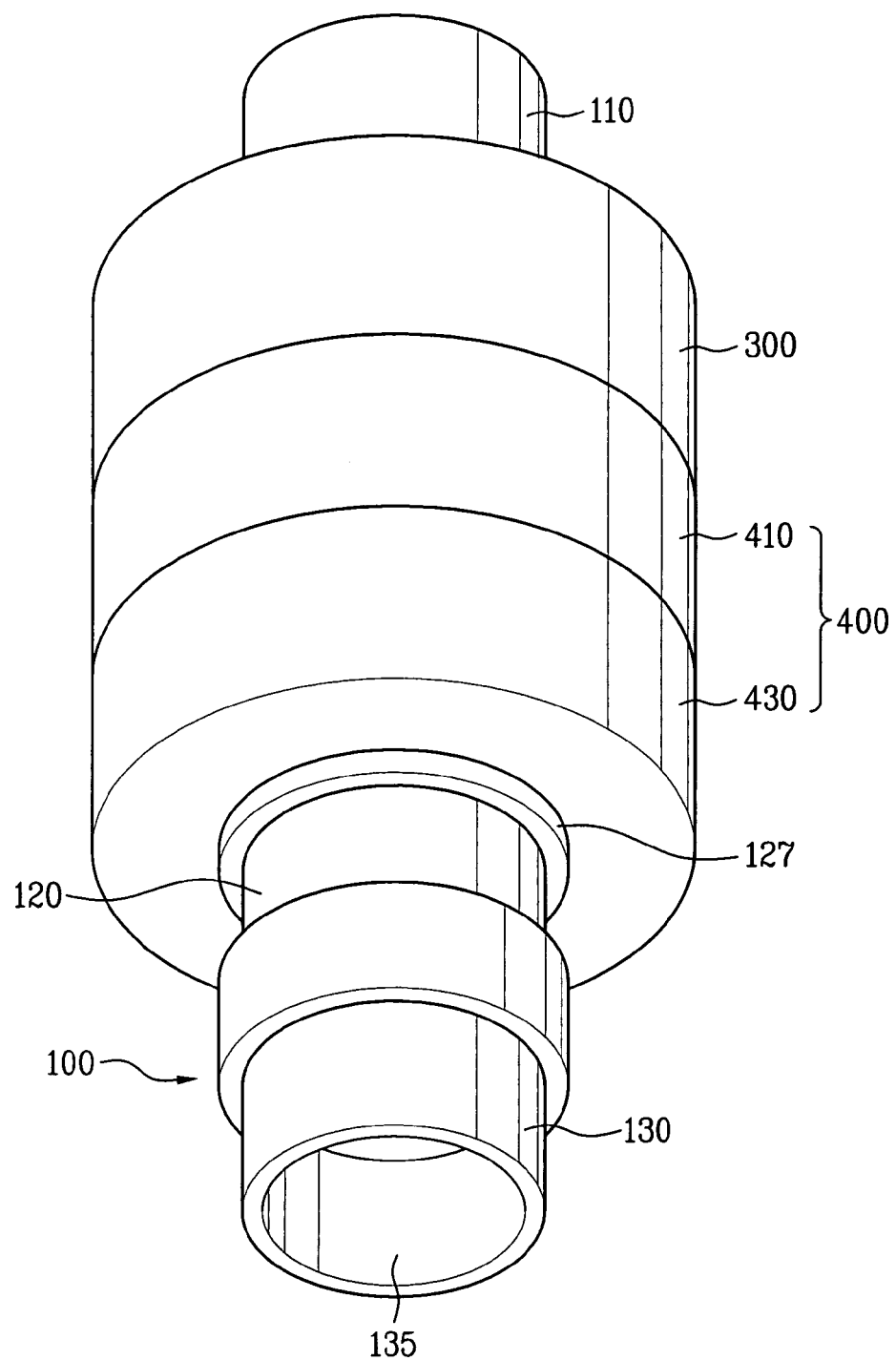
FIG. 5 illustrates a perspective view of an electromagnetic control valve in accordance with a second preferred embodiment of the present invention.
Figure 6:
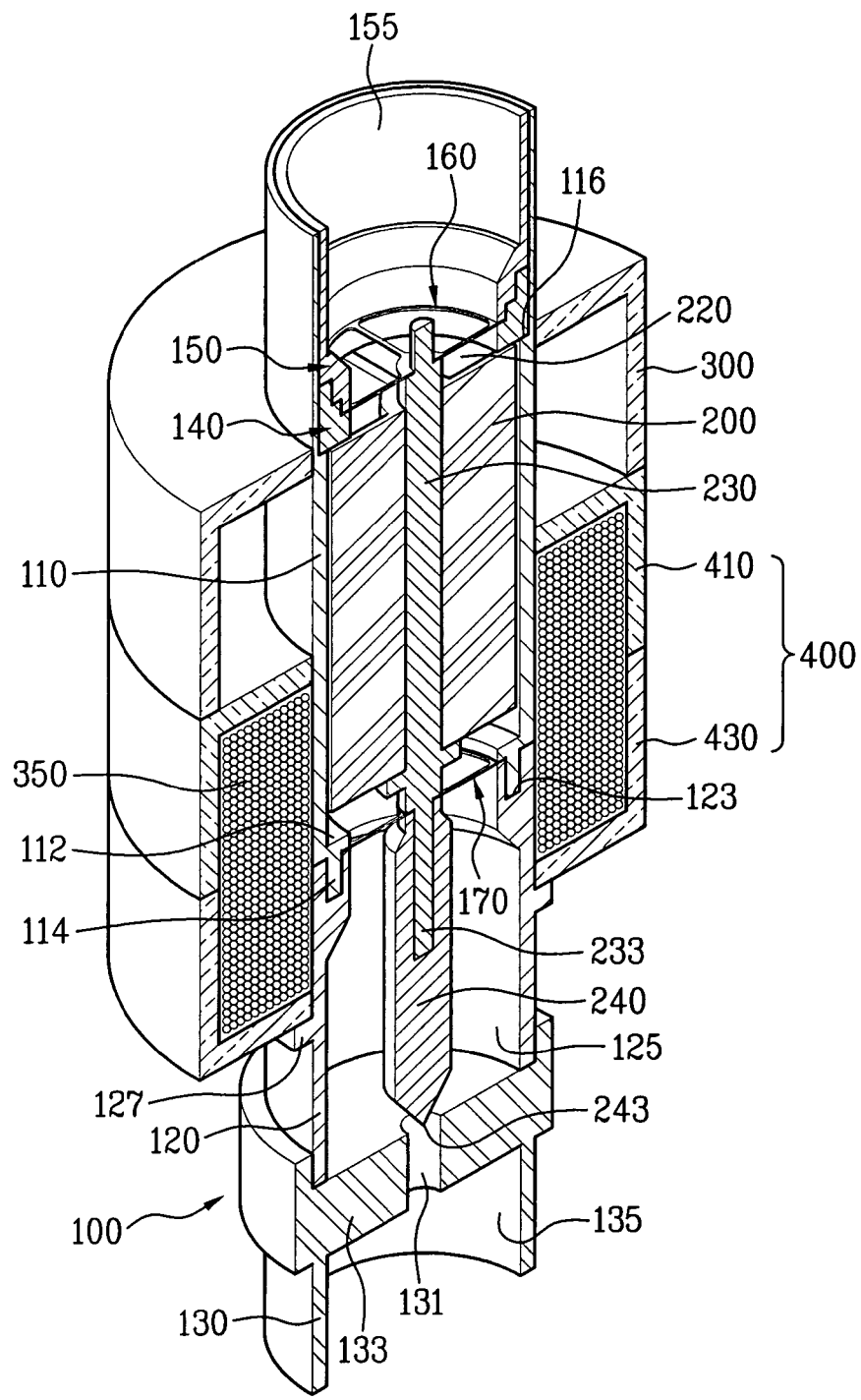
FIG. 6 illustrates a perspective view of a section of the control valve in FIG. 5.
Figure 7A:
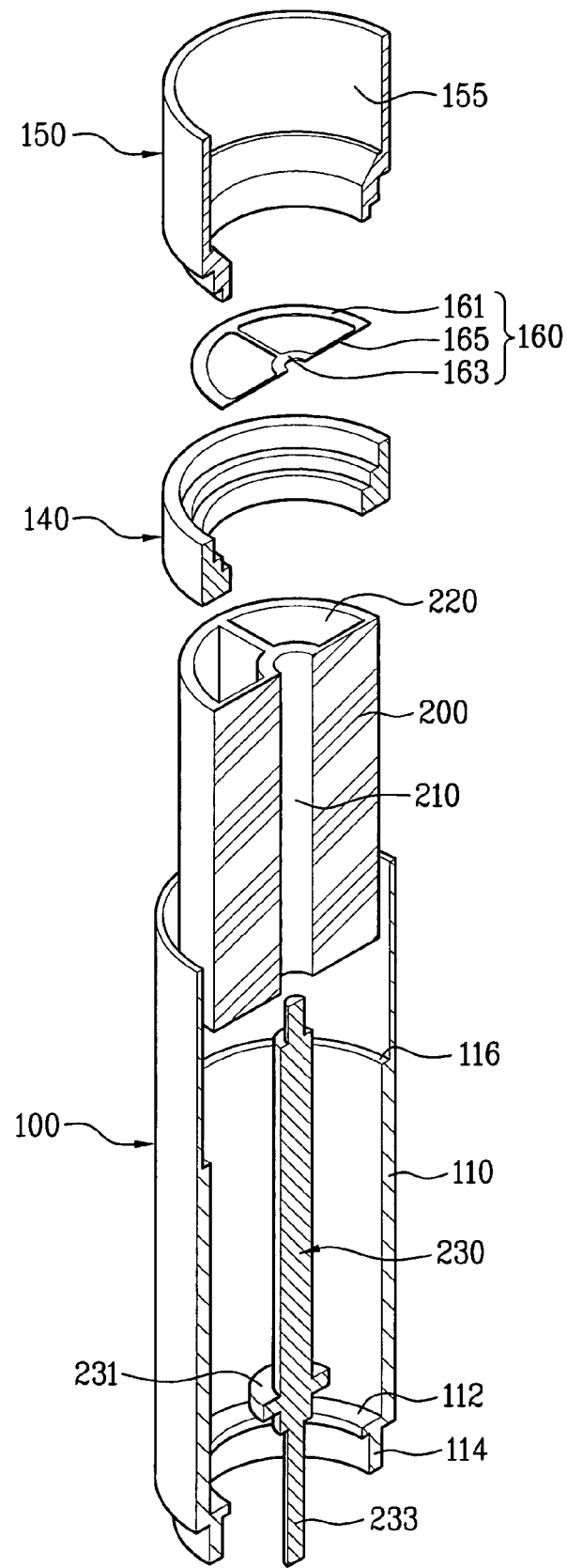
Figure 7B:
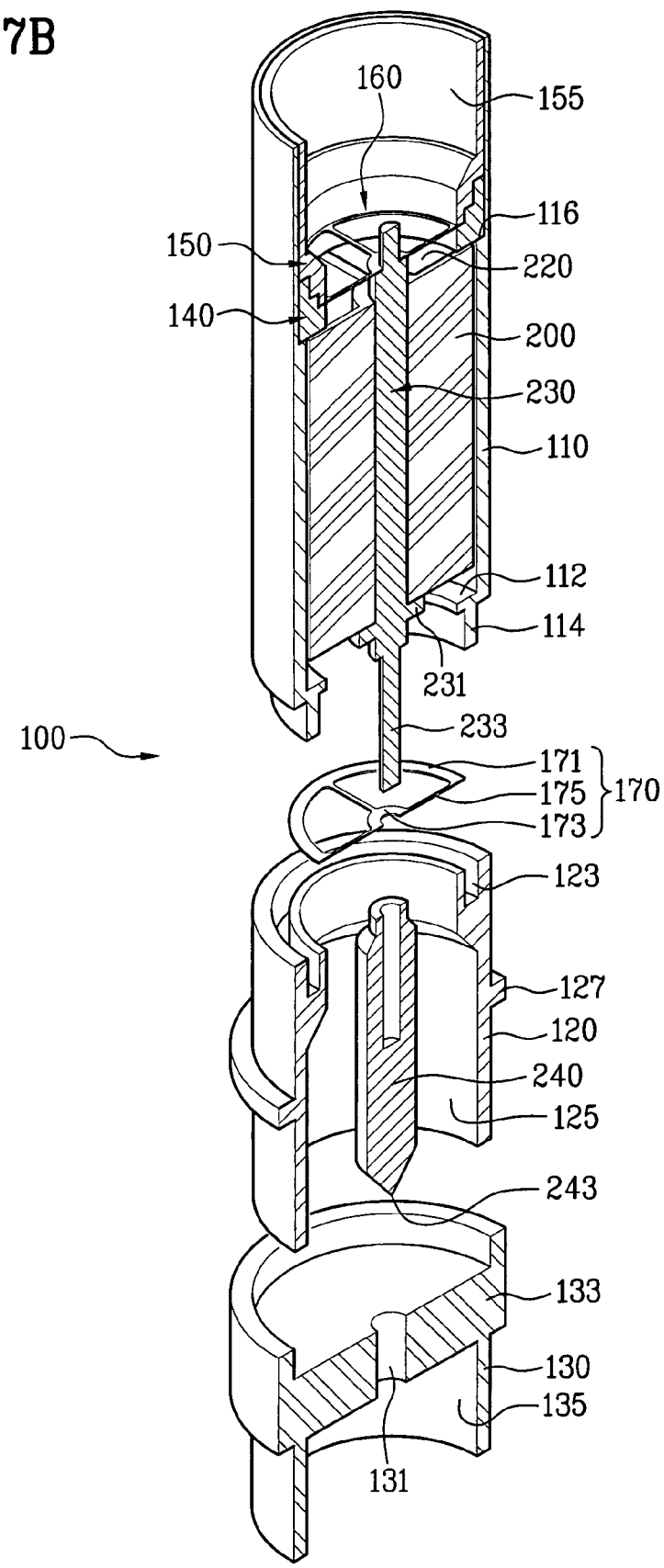
Figure 7C:
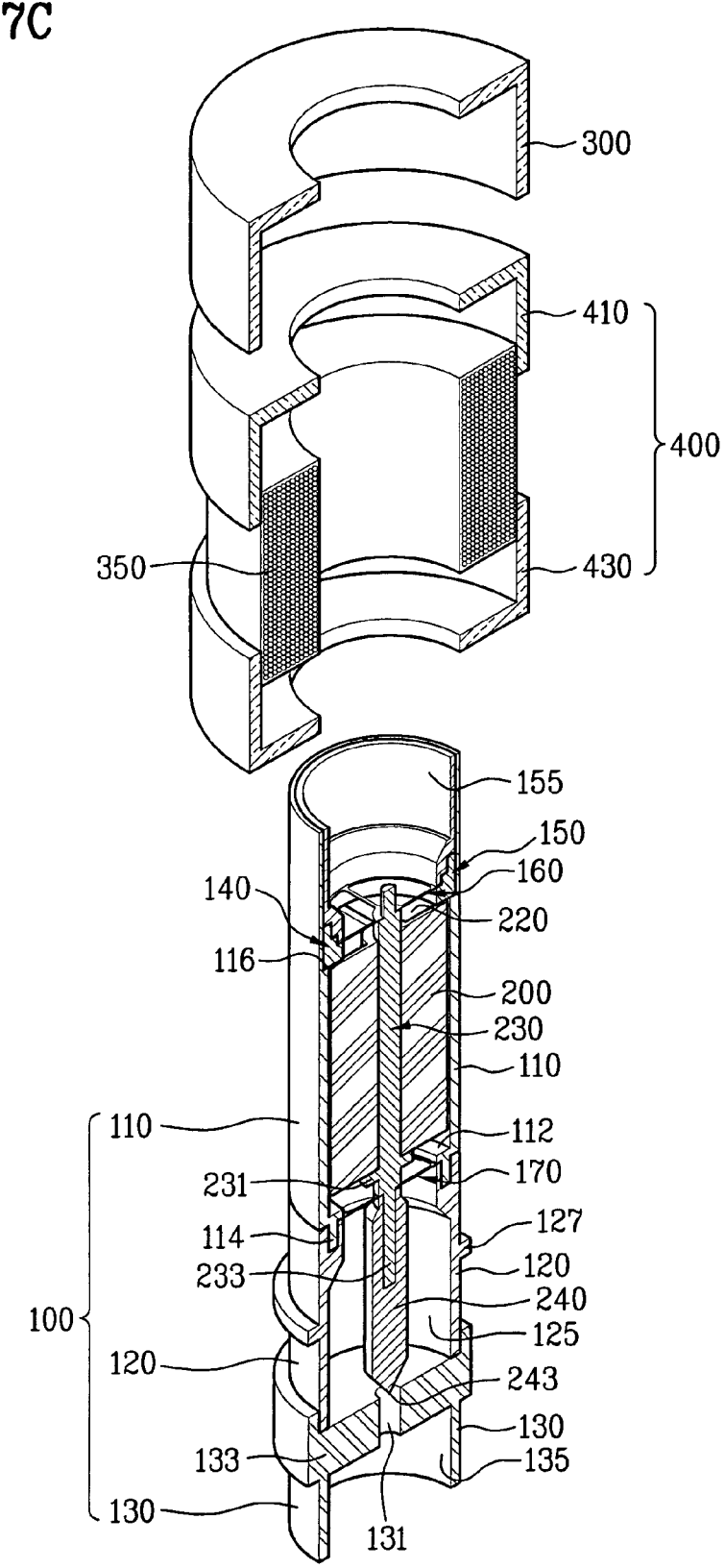

FIG. 5 illustrates a perspective view of an electromagnetic control valve in accordance with a second preferred embodiment of the present invention, and FIG. 6 illustrates a perspective view of a section of the control valve in FIG. 5. FIGS. 7A~7C illustrate partially disassembled perspective views of the control valve in FIG. 5, wherein FIG. 7A illustrates a disassembled perspective view showing components substantially in an upper part of an inside of a valve body, FIG. 7B illustrates a disassembled perspective view showing components substantially in a lower part of an inside of a valve body, and FIG. 7C illustrates a disassembled perspective view showing a valve body with components fitted inside and outside thereof.

Though the control valve of the first embodiment changes a flow direction, the control valve of the second embodiment does not change the flow direction. For this, as shown in FIGS. 5~7B, the two ports, i.e., the first port 135 and the second port 155 are formed in the top and bottom of the valve body 100, respectively. Accordingly, in the second embodiment, the fluid is introduced through one of the first port 135 and the second port 155, and discharged through the other one. In this instance, it is required that the valve body 100 can provide an adequate space therein for flow of the fluid, for which the permanent magnet 200 has a flow passage 220. Therefore, for an example, the fluid introduced through the first port 135 is discharged through the second port 155 via the orifice 131 and the flow passage 220 in the permanent magnet 200, which will be described in more detail.

Referring to FIGS. 5~7B, different from the first embodiment, in the second embodiment, the second port 155 is formed in the top of the valve body 100, for an example, in the cap 150. In the second embodiment, the valve body 100 includes three pieces, i.e., first to third pieces 110, 120, and 130. The cap 150 is joined to the top of the first piece 110, and the large second port 155 is formed in a central part of the cap 150 in the up/down direction. Therefore, the second port 155 makes an outside space above the first piece 110 and the space 111 in the valve body 100 in communication. It is preferable that the second port 155 is disposed on the same axis with the first port 135, for reduction of a flow resistance, and mounting the control valve of the present invention without change of the flow direction.

In the meantime, as shown in FIG. 5, different from the first embodiment, it is preferable that the bottom of the first piece 110 is opened fully. This is for securing a flow passage of the fluid flowing an inside of the valve body 100 through the second and first ports 155 and 135. Therefore, it is preferable that the step 112 projected from an inside wall of the first piece 110 for supporting the permanent magnet 200 is projected just to support some of the bottom circumferential part of the permanent magnet 200.

Referring to FIG. 6, the coil 350 is wound, not only on the outside circumferential surface of the first piece 110, but also on an upper part of the outside circumferential surface of the second piece 120. If the control valve is provided with the second yoke 400, the second yoke 400 is also mounted on an upper side of the outside circumferential surface of the valve body 100. In the meantime, as shown in FIG. 7C, in the second embodiment, since the coil 350 and the second yoke 400 are fitted to the outside circumferential surfaces of, not only the first piece 110, but also the second piece 120, the second piece 120 has a flange 127 projected from the outside circumferential surface of the second piece 120 for supporting the coil 350 and the second yoke 400. The flange, not only supports the coil 350 and the second yoke 400 from the bottom, but also positions the coil 350 and the second yoke 400 in assembly.

In the meantime, in the second embodiment, since the coil 350 and the second yoke 400 are mounted on the outside circumferential surfaces of the first and second pieces 110 and 120, it is preferable that the first and second pieces 110 and 120 are formed of a nonmagnetic substance, for giving no influence to the magnetic field of the permanent magnet 200. Of course, more preferably, the third piece 130 is formed of a nonmagnetic substance.

Referring to FIG. 7A, the permanent magnet 200 has at least one flow passage 220 running in the up/down direction. As shown in FIG. 7A, it is preferable that there are a plurality of the flow passages 220 disposed in a radial direction, for securing a larger flow passage and minimizing a flow resistance.

Figure 8A:
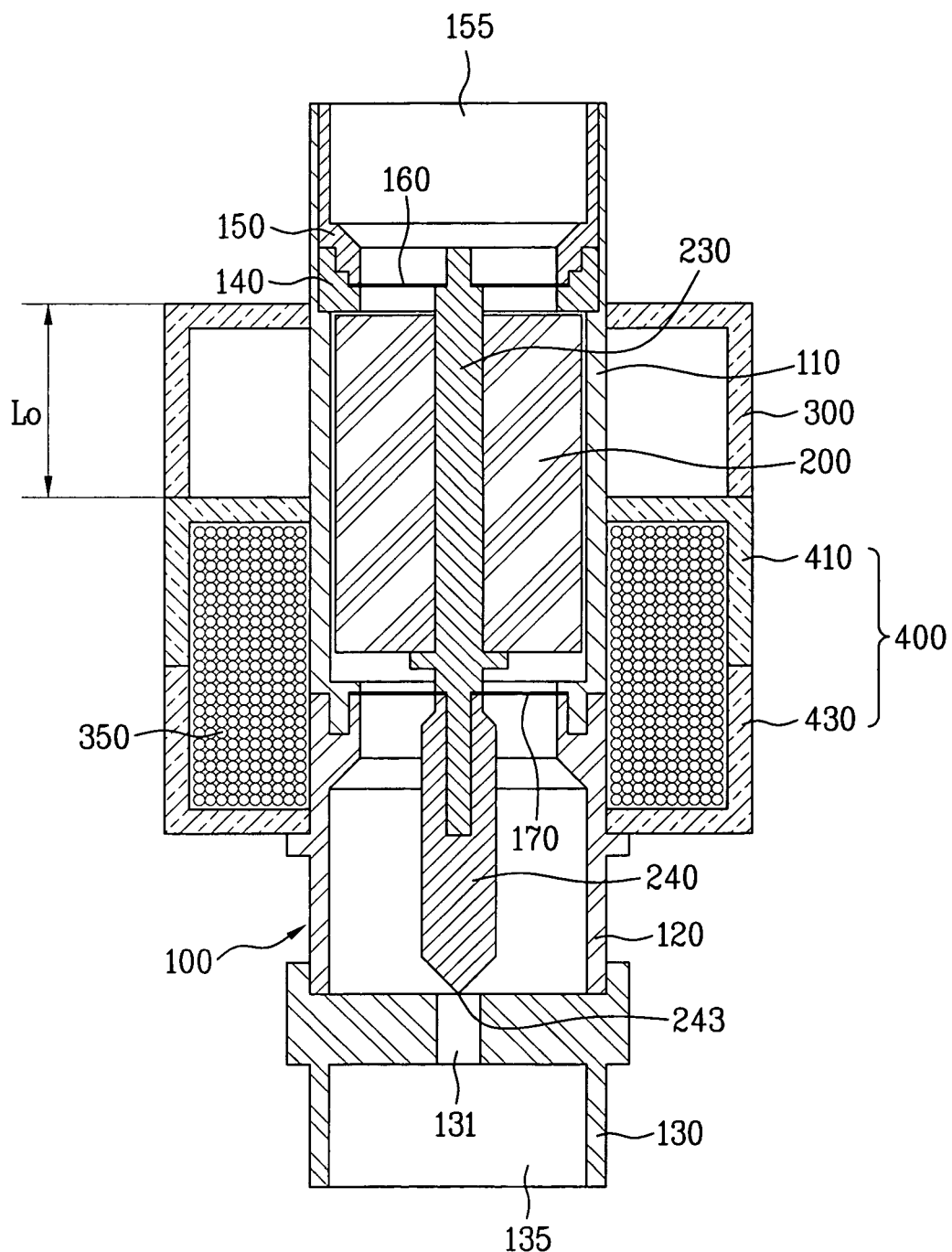
Figure 8B:
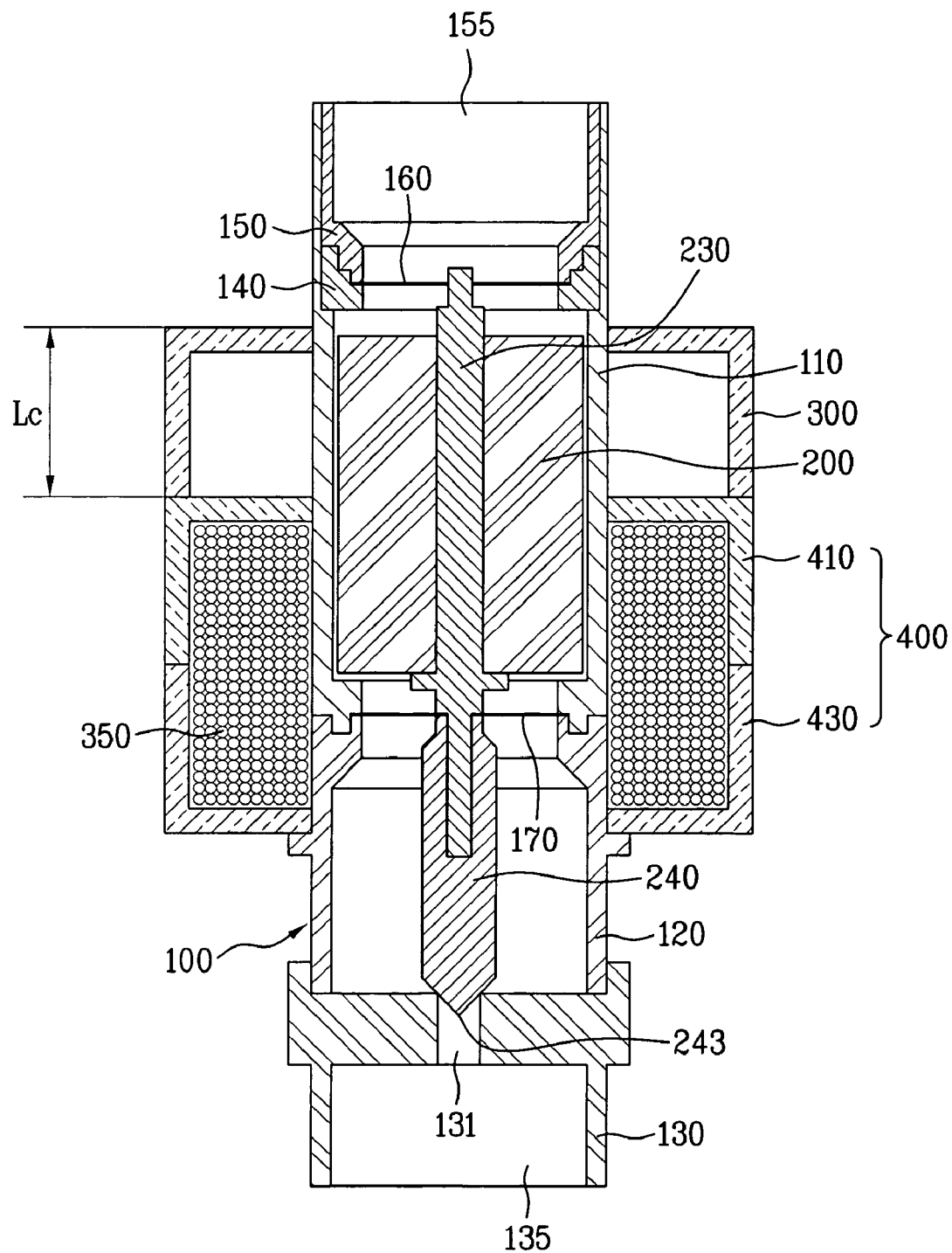

In the meantime, since description of the components and relations between the components, not given in above, are similar to the description of the components in the first embodiment having the same reference symbols, the description will be omitted. As shown in FIGS. 8A and 8B, the second embodiment can also be embodied as the normal open type or the normal close type, with a method the same with the first embodiment. The assembly of the second embodiment control valve is the same with the first embodiment control valve. No more description of the second embodiment will be given, and the operation principle of the electromagnetic control valve of the present invention will be described with reference to FIGS. 9~11B. Of course, the following description is applicable both to the first and second embodiments.

Figure 10:
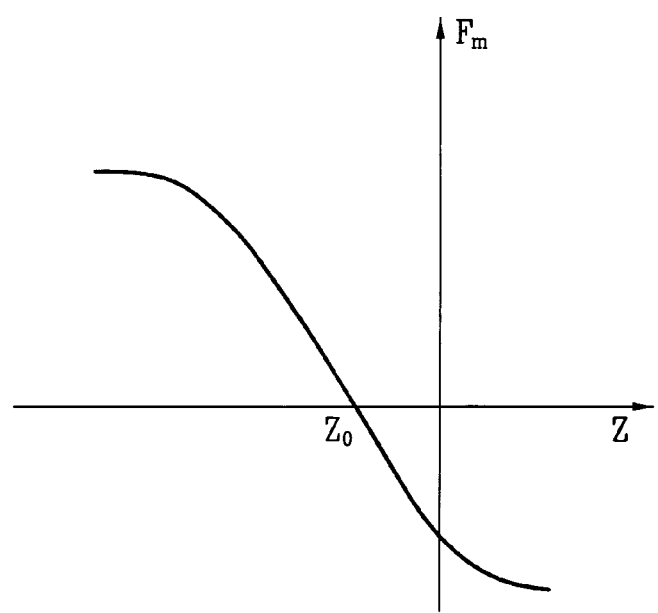
FIG. 10 illustrates a graph showing a relation between a magnetic force Fm applied to a permanent magnet versus a vertical displacement 'Z' of the permanent magnet.
Figure 11A:
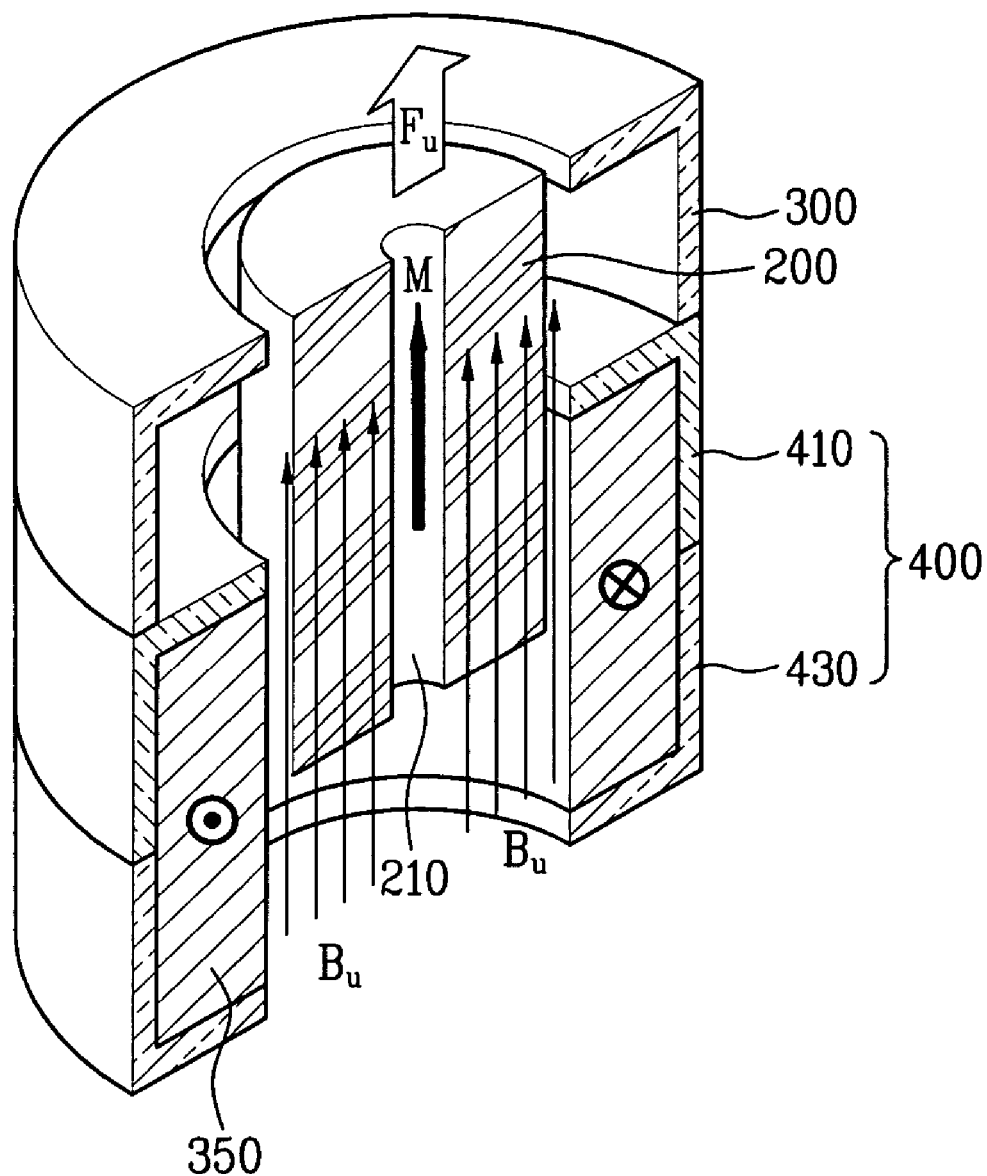
Figure 11B:
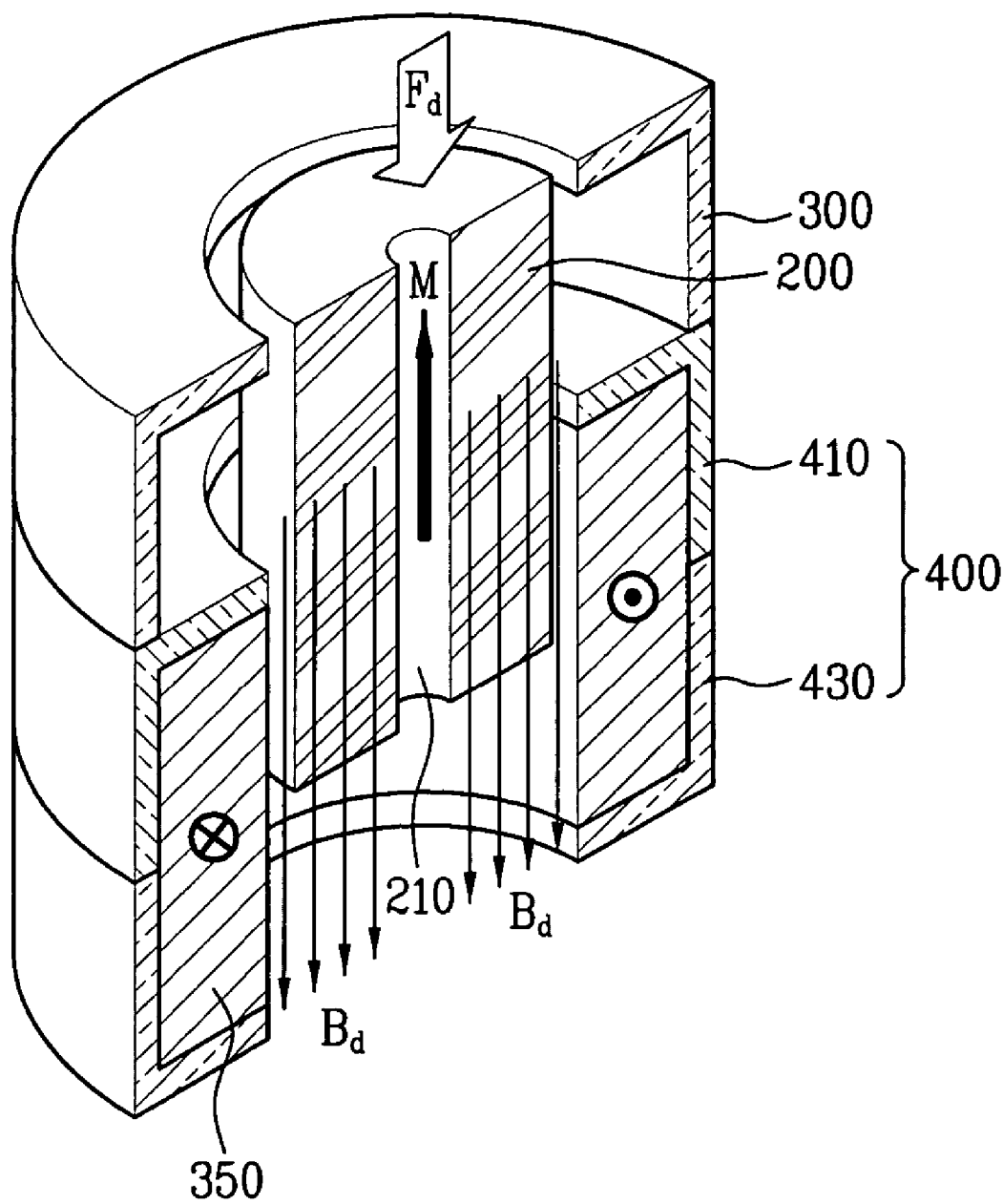

FIG. 9 illustrates a perspective view showing nonmagnetic components removed from valve for showing a principle a permanent magnet levitated by a magnetic force in a valve of the present invention schematically, and FIG. 10 illustrates a graph showing a relation between a magnetic force Fm applied to a permanent magnet versus a vertical displacement 'Z' of the permanent magnet. FIGS. 11A~11B illustrate perspective views each showing a relation between an induction field Bu or Bd formed according to a direction of current in a coil versus an induced electromotive force Fu or Fd applied to a permanent magnet, wherein FIG. 11A illustrates a case when the current is applied to the coil in an anti-clockwise direction when the drawing is seen from above, and FIG 11B illustrates a case when the current is applied to the coil in a clockwise direction when the drawing is seen from above.

Referring to FIG. 9, when no current is applied to the coil 350, the permanent magnet 200 is levitated to a position at which the top of the permanent magnet 200 has the same altitude with the top of the first yoke 300. In more detail, a magnetic field around an upper part of the permanent magnet 200 is concentrated around an upper part of the first yoke 300. Therefore, the upper part of the permanent magnet 200 tries to maintain a position the same with the upper part of the first yoke 300 due to the concentrated magnetic field. In this instance, if the permanent magnet moves up/down along a Z-axis in FIG. 9, there is an intensive magnetic field formed around the permanent magnet 200 by the permanent magnet 200, the first yoke 300, and the second yoke 400, and a magnetic force Fm applied to the permanent magnet 200 caused by the magnetic field has an aspect as shown in FIG. 10. For reference, the Z-axis represents a height of the upper part of the permanent magnet 200, and Zo represents a height of the upper part of the permanent magnet 200 when the permanent magnet 200 is at a height the same with the height of the first yoke 300.

Referring to FIG. 10, if the position of the upper part of the permanent magnet 200 is lower than Zo, the magnetic force exerts upward, and if the position of the upper part of the permanent magnet 200 is higher than Zo, the magnetic force exerts downward. In addition to this, if the permanent magnet 200 breaks away from the Zo position and moves up or down, a restoring force exerts to the permanent magnet 200 for restoring the permanent magnet 200 to an original position as an elastic energy is accumulated on the springs 160 and 170. By the magnetic force and the elastic restoring force of the springs 160 and 170, the permanent magnet 200 can maintain very stable levitated state at a fixed position when no current is applied to the coil 350.

If the current is applied to the coil 350 under above state, the permanent magnet 200 moves up or down. This principle will be described with reference to FIGS. 11A and 11B. In FIGS. 11A and 11B, 'M' denotes a magnetic field intensity of the permanent magnet 200, and Bu and Bd denote induction fields formed when the current is applied to the coil 350. The Fu and Fd denote induced electromotive forces generated when the current is applied to the coil 350.

Referring to FIG. 11A, when the current is applied to the coil 350 in an anti-clockwise direction when the valve is seen from above, by the law of magnetic induction, an upward magnetic field Bu is induced in the valve body 100, with an intensity proportional to the intensity of the current applied to the coil 350. The induced magnetic field exerts an upward induced electromotive force 'Fu' to the permanent magnet 200. According to this, the permanent magnet 200 moves upward, to move the needle 240 away from the orifice 131, that makes the opened area of the orifice 131 larger or the orifice 131 to be opened, completely.

In the meantime, if the permanent magnet 200 moves upward by the induced electromotive force, different forms of restoring forces exert on the permanent magnet 200 proportional to a moved up height of the permanent magnet 200. As the restoring forces exerting in this instance, there are the magnetic force exerting on the permanent magnet 200 formed by the permanent magnet 200, the first yoke 300, and the second yoke 400, and the elastic restoring force formed by the springs 160 and 170. In addition to this, when the fluid flows from the second port 121 to the first port 135, there can be a pressure drop caused by the fluid passing through the orifice 131. The pressure drop will be described, briefly.

When the needle 240 opens the orifice 131, the fluid flows downward through the orifice 131, to cause the pressure drop in a flow direction of the fluid, i.e., in downward. This pressure drop exerts a force to the needle 240, the rod 230, and the permanent magnet 200. At the end, the forces from the fluid pressure and the pressure drop serve as a force for restoring the permanent magnet 200 moving upward by the induced electromotive force. Opposite to this, if the fluid flows from the first port 135 to the second port 121, the fluid pressure exerts upward. Therefore, in this case, since the fluid pressure moves up the permanent magnet 200, the fluid pressure serves, not as a restoring force, but as a moving up force.

Therefore, as described before, when the current is applied to the coil 350, the permanent magnet 200 moves up to, and stops at, a point where the induced electromotive force that moves up the permanent magnet 200 and the restoring force that restores the permanent magnet 200 reach to an equilibrium. Therefore, if the current is applied to the coil continuously, the needle 240 maintains a moved up state together with the permanent magnet 200, to leave open the orifice 131.

In the meantime, if the intensity of the current applied to the coil 350 is changed, to change strength of the induced electromotive force, the needle 240 comes to a new position where the strength of the changed induced electromotive force and the restoring force reach to equilibrium. Then, the tip 243 of the needle 240 moves, resulting to make a linear change of the opened area of the orifice 131, i.e., an effective area the fluid can pass. Thus, the control valve of the present invention can change a flow rate of the fluid passing through the orifice 131 very easily by controlling the intensity of the current applied to the coil 350. In the meantime, the case illustrated in FIG. 11A is applicable to the control valve fabricated such that the control valve maintains a state in which the needle 240 is slightly inserted in the orifice 131 when the control valve is of the normal close type as illustrated in FIGS. 4B and 8B, or no current is applied to the coil 350.

Referring to FIG. 11B, when the current is applied to the coil 350 in a clockwise direction when the valve is seen from above, by the law of the magnetic induction, a downward magnetic field 'Bd' is induced in the valve body 100, with intensity proportional to the intensity of the current applied to the coil 350. The induced magnetic field exerts a downward induced electromotive force 'Fd' to the permanent magnet 200. According to this, the permanent magnet 200 moves downward, to move the needle 240 closer to the orifice 131, that makes the opened area of the orifice 131 smaller or the orifice 131 to be closed, completely.

Alike the case of FIG. 11B, in a case of FIG. 11A too, a restoring force is formed when the permanent magnet 200 moves. Therefore, the permanent magnet 200 moves down until a point the induced electromotive force and the restoring force reach to equilibrium. According to this, the needle 240 also moves down together with the permanent magnet 200, resulting to reduce the opened area of the orifice 131 or close the opened area completely. Therefore, the present invention permits to control the flow rate of the fluid passing through the orifice 131 effectively, even when the current is applied in a direction shown in FIG. 11B. In the meantime, the case illustrated in FIG 11B is applicable to the control valve fabricated such that the control valve maintains a state in which the needle 240 is slightly inserted in the orifice 131 when the control valve is of the normal open type as illustrated in FIGS. 4A and 8A, or no current is applied to the coil 350.

In the meantime, referring to FIGS. 4A and 11B, if application of the current to the coil 350 is cut off in a state the current is applied to the coil 350, the permanent magnet 200 and the needle restore to original positions by the restoring force. In this instance, if the current is cut off by reducing the current slowly, problems caused by rapid restoration, such as exertion of an excessive force to the spring 160 and 170, occurrence of noise caused when the needle 240 hits the opening of the orifice 131, or the permanent magnet 200 hits the limiter 140, and malfunction, or breakage, can be prevented, effectively.

The foregoing electromagnetic control valve of the present invention can be embodied as a linear expansion valve which can control a flow rate linearly by controlling direction and intensity of the current, or also as a bistable on/off valve in which the orifice 131 is opened or closed when the current is applied. Such an electromagnetic control valve of the present invention has a wide application in the field of controlling flow rate of a fluid flowing in a tube, such as linear expansion valves using adiabatic expansion of a fluid in air conditioners, and refrigerators. Moreover, the electromagnetic control valve of the present invention has an application as a control valve for controlling a super charging pressure of a fuel injector in an automobile electronically controlled engine, in a hydraulic pressure controller for an automobile automatic transmission gear, or in a pressure controller for an active suspension, a hydraulic pressure controller, or an automatic braking system.

As has been described, the electromagnetic control valve of the present invention has the following advantages.

First, since the structure is simple, and the components have relations very close to one another, assembly of the control valve is very easy. Accordingly, as the assembly and workability are easy, the productivity is improved. This lowers a production cost, which brings about an effect of enhancing economy.

Second, by controlling direction and intensity of the current to the coil, the opened area of the orifice through which the fluid passes can be varied linearly. According to this, the flow rate of the fluid can be controlled, very easily.

Third, in a case the intensity of the current to the coil is fixed, the needle either opens or closes the orifice when the current is applied to the coil. According to this, the electromagnetic control valve of the present invention can be used as a bistable on/off valve that either opens or closes the orifice 131.

Fourth, the operation by the electromagnetic force permits a faster response and higher reliability than the related art.

Fifth, different from the related art, the electromagnetic control valve of the present invention requires no mechanical or electric connection of the components to be operated in a part the fluid present and components that drive the components. Therefore, seal ability is improved more than the related art valve.

Sixth, no separate actuator is required for the control valve of the present invention. Therefore, the control valve of the present invention can be fabricated smaller than the related art valve, which permits to fabricate an entire apparatus more compact.

Seventh, the electromagnetic control valve in accordance with a first preferred embodiment of the present invention has two ports the tubes are connected thereto formed in the outside circumferential surface and the bottom of the valve body respectively. Therefore, the valve is useful in a case a control valve is mounted in a part the flow path turns in a right angle.

Eighth, the electromagnetic control valve in accordance with a second preferred embodiment of the present invention has two ports the tubes are connected thereto formed in the top and the bottom of the valve body respectively. Therefore, the valve is useful in a case a control valve is mounted in a part the flow path has no change. Such a structure permits substantial reduction of a space required for mounting.

Moreover, all the advantages described in the course of describing the present invention are also included to the advantages of the present invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An electromagnetic control valve comprising:
   a valve body having first and second ports for communicating an inside and an outside of the valve, an orifice inside thereof for making the first and the second ports in communication, and a space inside of an upper part thereof;
   a permanent magnet fitted in the space to be movable in an up/down direction;
   a coil connected to a circuit and wound on an outside circumferential surface of the valve body;
   a first yoke fitted to surround the outside circumferential surface of the valve body at a position opposite to an upper part of the permanent magnet for sustaining a levitated state of the permanent magnet by a magnetic force; and
   a needle having a tapered tip disposed at a position opposite to a side of the orifice, for making linear variation of an opened area of the orifice while the needle moves together with the permanent magnet when the permanent magnet moves up or down by an electromagnetic force generated when a current is applied to the coil.

2. The valve as claimed in claim 1, wherein the valve body has a long cylindrical form disposed in the up/down direction.

3. The valve as claimed in claim 1, wherein the valve body includes detachable three pieces.

4. The valve as claimed in claim 1, wherein the first port is formed in a bottom of the valve body, and the second port is formed in a point of the outside circumferential surface of the valve body.

5. The valve as claimed in claim 4, wherein the first port and the second port are formed in a vertical direction to each other.

6. The valve as claimed in claim 4, wherein the valve body includes;
   a first piece having the outside circumferential surface the coil and the first yoke joined thereto, and an inside the permanent magnet held therein,
   a second piece having an outside circumferential surface with the second port formed therein, an opened bottom, and a cavity formed therein for positioning the needle therein when the second piece is connected to the bottom of the first piece, and
   a third piece having the orifice formed therein, connected to a bottom of the second piece to dispose the needle at a position opposite to the orifice.

7. The valve as claimed in claim 6, wherein the first piece is formed of a nonmagnetic substance.

8. The valve as claimed in claim 1, wherein the first port is formed in the bottom of the valve body, and the second port is formed in a top of the valve body.

9. The valve as claimed in claim 8, wherein the permanent magnet includes at least one vertical flow passage to make the second port and the orifice in communication.

10. The valve as claimed in claim 8, wherein the permanent magnet includes a plurality of flow passages formed in a radial direction.

11. The valve as claimed in claim 8, wherein the valve body includes;
    a first piece having the second port formed in a top thereof, the outside circumferential surface the coil and the first yoke joined thereto, and an inside the permanent magnet held therein,
    a second piece having opened top and bottom, an outside circumferential surface with the coil wound on a part thereof, and a cavity formed therein for positioning the needle therein when the second piece is connected to the bottom of the first piece, and
    a third piece having the orifice formed therein, connected to a bottom of the second piece to dispose the needle at a position opposite to the orifice.

12. The valve as claimed in claim 11, wherein the first and second pieces are formed of a nonmagnetic substance.

13. The valve as claimed in claim 11, wherein the first port and the second port are formed on a straight line.

14. The valve as claimed in claim 1, wherein the valve body includes a cap detachably fitted thereto.

15. The valve as claimed in claim 14, wherein the cap is formed of a nonmagnetic substance.

16. The valve as claimed in claim 14, wherein the second port is formed in a central part of the cap in the up/down direction.

17. The valve as claimed in claim 14, further comprising a limiter fitted between the cap and the permanent magnet for reducing a horizontal sectional area of the space to limit a moving up height of the permanent magnet.

18. The valve as claimed in claim 17, wherein the limiter has a ring form with an inside diameter smaller than an outside diameter of the permanent magnet.

19. The valve as claimed in claim 17, wherein the limiter is formed of a nonmagnetic substance.

20. The valve as claimed in claim 1, further comprising a limiter fitted in an upper part of the space for reducing a horizontal sectional area of the space to limit a moving up height of the permanent magnet.

21. The valve as claimed in claim 1, wherein the first yoke is formed of a substance having a high permeability.

22. The valve as claimed in claim 1, further comprising a second yoke mounted on the outside circumferential surface of the valve body to surround the coil.

23. The valve as claimed in claim 22, wherein the second yoke is formed of a substance having a high permeability.

24. The valve as claimed in claim 22, wherein the second yoke includes;
    an upper piece mounted to enclose the upper part of the coil, and
    a lower piece mounted to enclose the lower part of the coil.

25. The valve as claimed in claim 1, wherein the needle is connected to a lower part of the rod fitted to pass the permanent magnet, for moving together with the permanent magnet.

26. The valve as claimed in claim 25, wherein the rod is formed of a nonmagnetic substance.

27. The valve as claimed in claim 1, wherein the needle is connected to the permanent magnet directly.

28. The valve as claimed in claim 25, further comprising at least one spring fitted such that parts thereof fastened to the valve body and the rod for preventing the permanent magnet, the rod, or the needle come into contact with an inside wall of the valve body, and providing a restoration force for the permanent magnet to restore to an original position, when the permanent magnet moves.

29. The valve as claimed in claim 28, wherein the spring includes;
    a first spring for supporting an upper part of the rod passed through the permanent magnet, and
    a second spring for supporting a lower part of the rod connected to the needle.

30. The valve as claimed in claim 28, wherein the first or second spring includes;
   a first ring fastened to the valve body,
   a second ring inside of the first ring having an inside circumference an outside circumference of the rod is inserted therein, and
   suspenders connected between the first ring and the second ring each having a great stiffness in a radial direction of the first ring and an elasticity in an up/down direction of the first ring.

31. The valve as claimed in claim 28, wherein the springs are formed of a nonmagnetic substance.

32. The valve as claimed in claim 1, wherein the needle is disposed to close the orifice in a state no current is applied to the coil.

33. The valve as claimed in claim 1, wherein the needle is disposed to open the orifice fully in a state no current is applied to the coil.

34. The valve as claimed in claim 1, wherein the needle is disposed to such that the tip thereof occupies a portion of the opened area of the orifice in a state no current is applied to the coil.

35. The valve as claimed in claim 1, wherein the electric circuit is a circuit that can control an intensity and a direction of the current applied to the coil as required so that the needle can linearly increase/decrease the opened area of the orifice.

36. The valve as claimed in claim 35, wherein the electric circuit includes a PWM circuit (pulse width modulation circuit) that can control digitized frequency and pulse width of an applied current as required.

37. The valve as claimed in claim 1, wherein the electric circuit is a circuit that can apply a current of a preset intensity to the coil so that the needle opens or closes the orifice as a bistable on/off valve.

38. The valve as claimed in claim 1, wherein the first port has an inlet tube for introducing a high pressure fluid thereto, and the second port has an outlet tube for discharging a fluid passed through the orifice.

39. The valve as claimed in claim 38, wherein the orifice has a diameter smaller than a diameter of the first port for dropping pressure and temperature of the fluid after the fluid passes the orifice.

40. The valve as claimed in claim 1, wherein the second port has an inlet tube for introducing a high pressure fluid thereto, and the first port has an outlet tube for discharging a fluid passed through the orifice.

41. The valve as claimed in claim 1, wherein the fluid introduced into the valve body, passes through the orifice, and discharged to an outside of the valve is in a gas state.

42. The valve as claimed in claim 1, wherein the fluid introduced into the valve body, passes through the orifice, and discharged to an outside of the valve is in a liquid state.

43. The valve as claimed in claim 1, wherein the fluid introduced into the valve body, passes through the orifice, and discharged to an outside of the valve is in a gas and liquid mixed state.

44. The valve as claimed in claim 1, wherein the fluid introduced into the valve body, passes through the orifice, and discharged to an outside of the valve is a super critical fluid.

* * * * *